(12) United States Patent
Wheeler

(10) Patent No.: US 9,828,553 B2
(45) Date of Patent: Nov. 28, 2017

(54) THERMAL PROCESS TO TRANSFORM CONTAMINATED OR UNCONTAMINATED FEED MATERIALS INTO USEFUL OILY PRODUCTS

(71) Applicant: Envirollea Inc., Calgary (CA)

(72) Inventor: Lucie B. Wheeler, Calgary (CA)

(73) Assignee: ENVIROLLEA INC., Calgary (CA)

( * ) Notice: Subject to any disclaimer, the term of this patent is extended or adjusted under 35 U.S.C. 154(b) by 0 days.

(21) Appl. No.: 14/765,711

(22) PCT Filed: Feb. 6, 2013

(86) PCT No.: PCT/CA2013/050091
§ 371 (c)(1),
(2) Date: Aug. 4, 2015

(87) PCT Pub. No.: WO2014/121368
PCT Pub. Date: Aug. 14, 2014

(65) Prior Publication Data
US 2015/0368567 A1    Dec. 24, 2015

(51) Int. Cl.
*C10B 47/30* (2006.01)
*C10G 7/00* (2006.01)
(Continued)

(52) U.S. Cl.
CPC .............. *C10G 7/006* (2013.01); *C10B 47/30* (2013.01); *C10B 55/04* (2013.01); *C10B 57/045* (2013.01);
(Continued)

(58) Field of Classification Search
CPC ........... C10B 47/30; C10B 1/10; C10B 55/04; C10B 57/045; C10B 57/08; C10G 9/02; C10G 9/04
See application file for complete search history.

(56) References Cited

U.S. PATENT DOCUMENTS 1,518,938 A   12/1924 Nielsen
1,877,987 A   9/1932 Schonberg
(Continued)

FOREIGN PATENT DOCUMENTS

CA    1099507    4/1981
CA    1120418    3/1982
(Continued)

OTHER PUBLICATIONS

Fortuna et al., "Pilot-scale experimental pyrolysis plant: Mechanical and operational aspects", Journal of Analytical and Applied Pyrolysis, vols. 40-41 (May 1997), pp. 403-417.
(Continued)

*Primary Examiner* — Jonathan Miller
(74) *Attorney, Agent, or Firm* — Bereskin & Parr LLP/S.E.N.C.R.L., s.r.l.

(57) ABSTRACT

The process is for thermally treating a feed material. The process comprises at least one step performed in a rotating kiln operating under positive pressure with a pressure control system and wherein in the process a sweep gas, that is an inert gas or a substantially non-reactive gas, is injected into the rotating kiln or in the feed stream entering the rotating operating kiln; or at least one step performed in a rotating kiln operating under positive pressure managing system; or at least one step performed in a rotating kiln wherein a sweep gas is injected in the rotating kiln or in the feed stream entering the rotating operating kiln. In step a), or in b) or in step c), the conditions of the thermal treatment are managed in order that the exit stream, after cooling, result in at least one liquid phase that is preferably essentially an oily liquid phase.

26 Claims, 15 Drawing Sheets

(51) Int. Cl.

| | | |
|---|---|---|
| *C10L 1/04* | (2006.01) | |
| *C10B 55/04* | (2006.01) | |
| *C10G 1/02* | (2006.01) | |
| *C10G 1/10* | (2006.01) | |
| *C10G 3/00* | (2006.01) | |
| *C10G 9/00* | (2006.01) | |
| *C10B 57/04* | (2006.01) | |
| *C10B 57/08* | (2006.01) | |
| *C10G 31/06* | (2006.01) | |
| *C10B 53/02* | (2006.01) | |
| *C10B 53/06* | (2006.01) | |
| *C10B 53/07* | (2006.01) | |

(52) U.S. Cl.
CPC ............ *C10B 57/08* (2013.01); *C10G 1/02* (2013.01); *C10G 1/10* (2013.01); *C10G 3/40* (2013.01); *C10G 7/003* (2013.01); *C10G 9/00* (2013.01); *C10G 31/06* (2013.01); *C10L 1/04* (2013.01); *C10B 53/02* (2013.01); *C10B 53/06* (2013.01); *C10B 53/07* (2013.01); *C10G 2300/1003* (2013.01); *C10G 2300/1007* (2013.01); *C10G 2300/1014* (2013.01); *C10G 2300/1018* (2013.01); *C10G 2400/04* (2013.01); *C10G 2400/10* (2013.01); *Y02P 30/20* (2015.11)

(56) References Cited

U.S. PATENT DOCUMENTS

| | | | |
|---|---|---|---|
| 2,023,942 A | 12/1935 | Wescott | |
| 2,785,115 A | 3/1957 | Borch | |
| 3,807,936 A | 4/1974 | Vering | |
| 4,014,643 A | 3/1977 | Musha et al. | |
| 4,039,130 A | 8/1977 | Hogan | |
| 4,131,418 A | 12/1978 | Kramm et al. | |
| 4,180,455 A | 12/1979 | Taciuk | |
| 4,280,879 A | 7/1981 | Taciuk | |
| 4,285,773 A | 8/1981 | Taciuk | |
| 4,411,074 A | 10/1983 | Daly | |
| 4,427,637 A | 1/1984 | Iwashita et al. | |
| 4,439,209 A | 3/1984 | Wilwerding et al. | |
| 4,473,464 A | 9/1984 | Boyer et al. | |
| 4,475,886 A | 10/1984 | Tyler | |
| 4,512,873 A | 4/1985 | Escher et al. | |
| 4,591,362 A | 5/1986 | Yudovich et al. | |
| 4,746,420 A | 5/1988 | Darian et al. | |
| 4,846,677 A | 7/1989 | Crivelli et al. | |
| 4,872,954 A | 10/1989 | Hogan | |
| 4,931,171 A | 6/1990 | Piotter | |
| 4,961,391 A | 10/1990 | Mak et al. | |
| 5,194,069 A | 3/1993 | Someus | |
| 5,316,743 A | 5/1994 | Leblanc et al. | |
| 5,366,595 A | 11/1994 | Padgette et al. | |
| 5,423,891 A | 6/1995 | Taylor | |
| 5,821,396 A | 10/1998 | Bouziane | |
| 6,203,765 B1 | 3/2001 | Taciuk et al. | |
| 6,589,417 B2 | 7/2003 | Taciuk et al. | |
| 7,354,462 B2 | 4/2008 | O'Rear | |
| 7,550,063 B2 | 6/2009 | Gawad | |
| 7,943,014 B2 | 5/2011 | Berruti et al. | |
| 8,298,406 B2* | 10/2012 | Coates | C10B 1/10 201/32 |
| 8,394,240 B2* | 3/2013 | Rinker | C10G 1/00 201/15 |
| 8,999,147 B2 | 4/2015 | Wheeler | |
| 9,089,803 B2* | 7/2015 | Stroeder | B01J 8/0055 |
| 9,458,391 B2 | 10/2016 | Wheeler | |
| 9,555,342 B2 | 1/2017 | Wheeler | |
| 2002/0029996 A1 | 3/2002 | Taciuk | |
| 2004/0231237 A1 | 11/2004 | Boer et al. | |
| 2005/0167337 A1 | 8/2005 | Bunger et al. | |
| 2008/0197012 A1 | 8/2008 | Berruti et al. | |
| 2009/0250331 A1 | 10/2009 | Hopkins et al. | |
| 2010/0077711 A1 | 4/2010 | Weigelt et al. | |
| 2010/0293853 A1* | 11/2010 | Feerer | C10K 1/101 48/76 |
| 2010/0294700 A1* | 11/2010 | Coates | C10B 1/10 208/400 |
| 2011/0011719 A1* | 1/2011 | Rinker | C10G 1/00 201/3 |
| 2011/0035998 A1 | 2/2011 | Badger et al. | |
| 2012/0006669 A1 | 1/2012 | Bronshtein et al. | |
| 2012/0055775 A1 | 3/2012 | Manderson et al. | |
| 2012/0132733 A1* | 5/2012 | Taylor | C09C 1/48 241/23 |
| 2012/0318716 A1 | 12/2012 | Wheeler | |
| 2013/0068587 A1 | 3/2013 | Wheeler | |
| 2015/0368564 A1 | 12/2015 | Wheeler et al. | |
| 2016/0053184 A1 | 2/2016 | Wheeler et al. | |

FOREIGN PATENT DOCUMENTS

| | | |
|---|---|---|
| CA | 1129195 | 8/1982 |
| CA | 1221047 | 4/1987 |
| CA | 1316344 | 4/1993 |
| CA | 1334129 | 1/1995 |
| CA | 2151792 | 12/1995 |
| CA | 2200525 | 10/1997 |
| CA | 2315774 | 9/1999 |
| CA | 2799751 | 11/2011 |
| CA | 2750129 | 2/2013 |
| CA | 2783608 | 1/2014 |
| EP | 1106672 | 6/2001 |
| GB | 1534302 | 11/1978 |
| GB | 2150271 | 6/1985 |
| WO | 9746843 | 12/1997 |
| WO | 2011143770 | 11/2011 |
| WO | 2012069501 | 5/2012 |
| WO | WO 2012/069501 A1 * | 5/2012 ............ B01J 8/00 |

OTHER PUBLICATIONS

English Abstract of JP2007040615, "Rotary Kiln", published on Feb. 15, 2004.

English Abstract of JP2008122043, "Rotary Kiln Furnace", published on May 29, 2005.

Fortuna et al., "Pilot-scale experimental pyrolysis plant: mechanical and operational aspects", Journal of Analytical and Applied Pyrolysis 40-41 (1997) 403-417.

English Abstract of SU889089, "Apparatus for Obtaining Magnesium Compounds", published on Dec. 15, 1981.

* cited by examiner

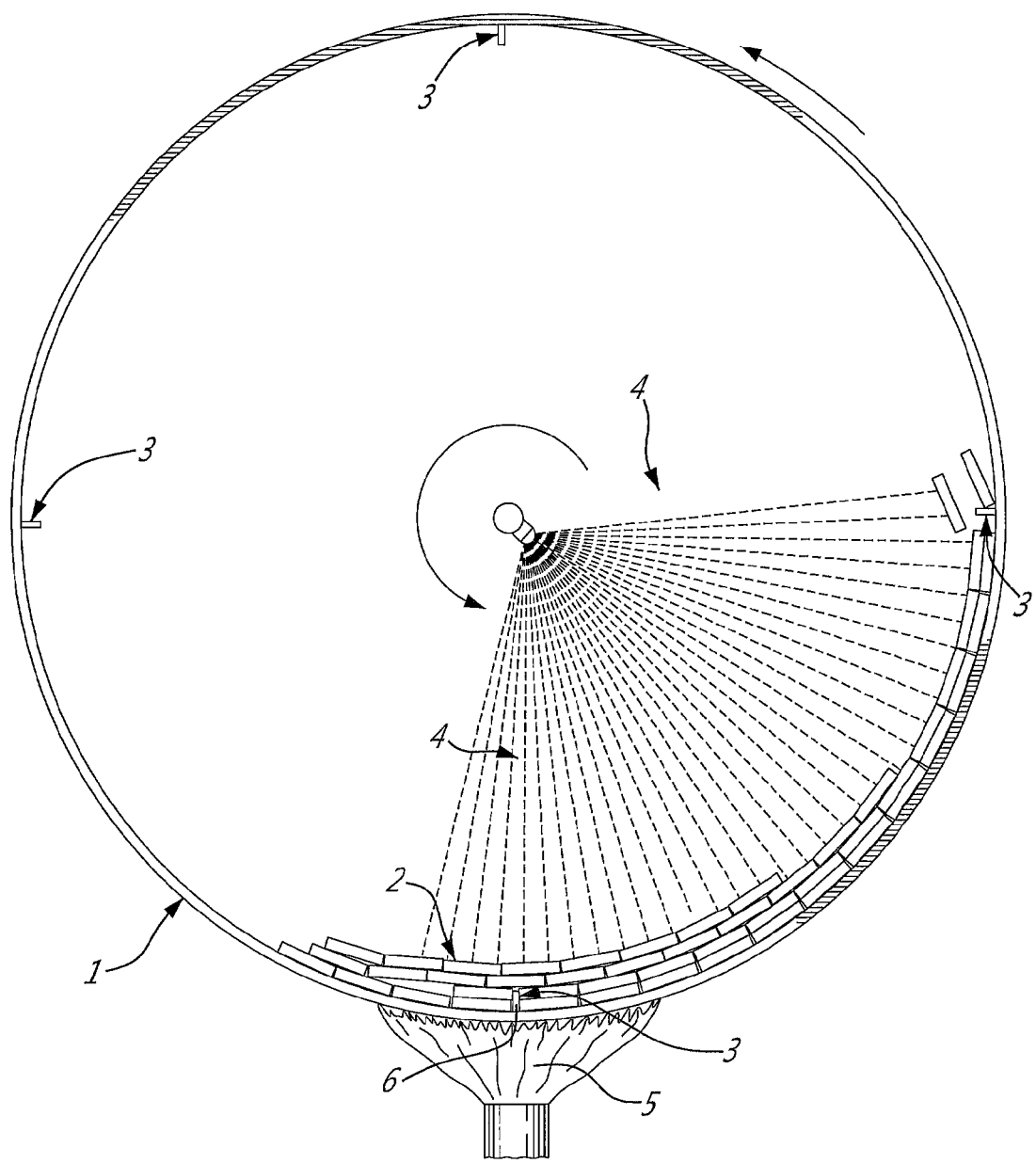

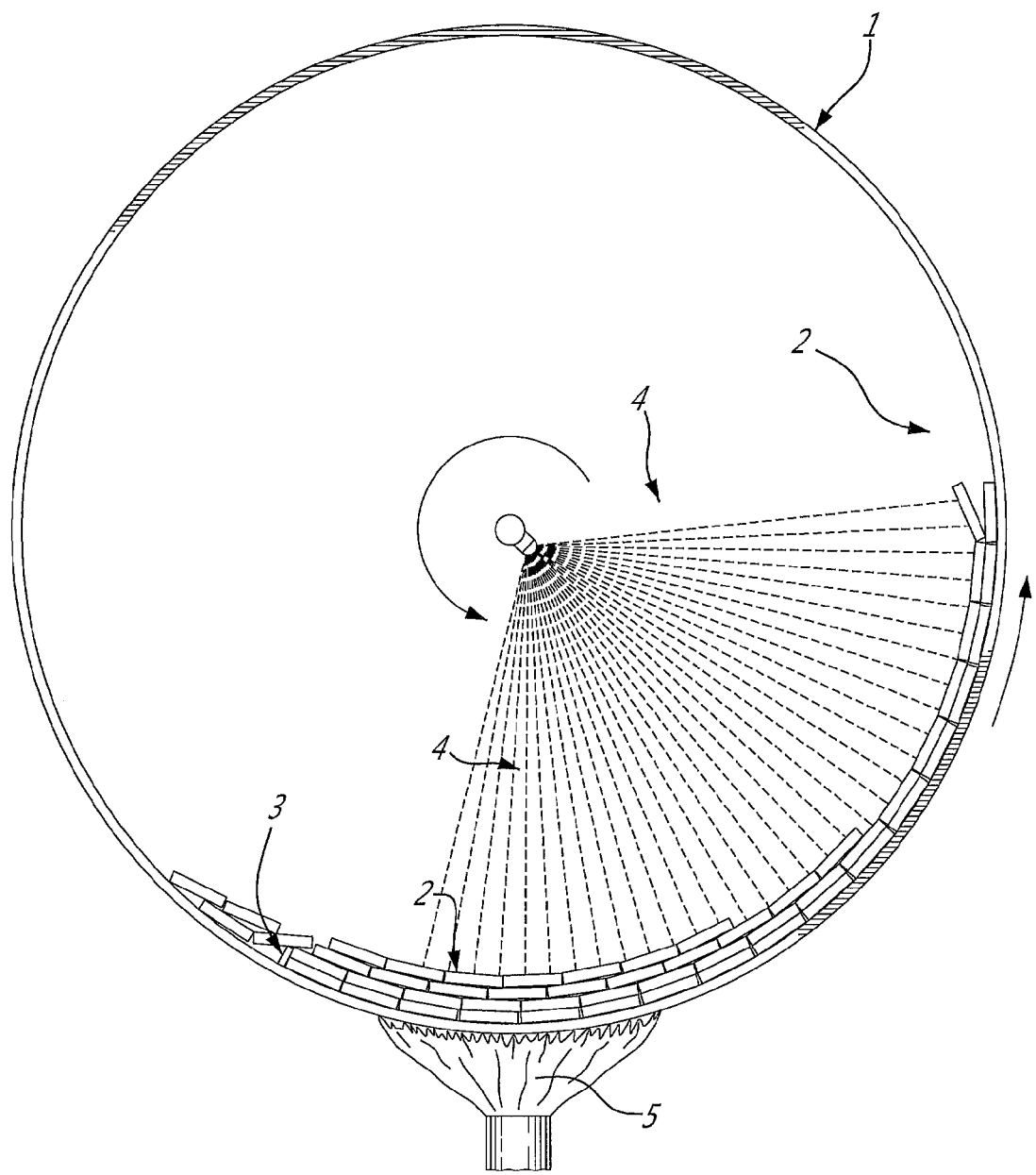

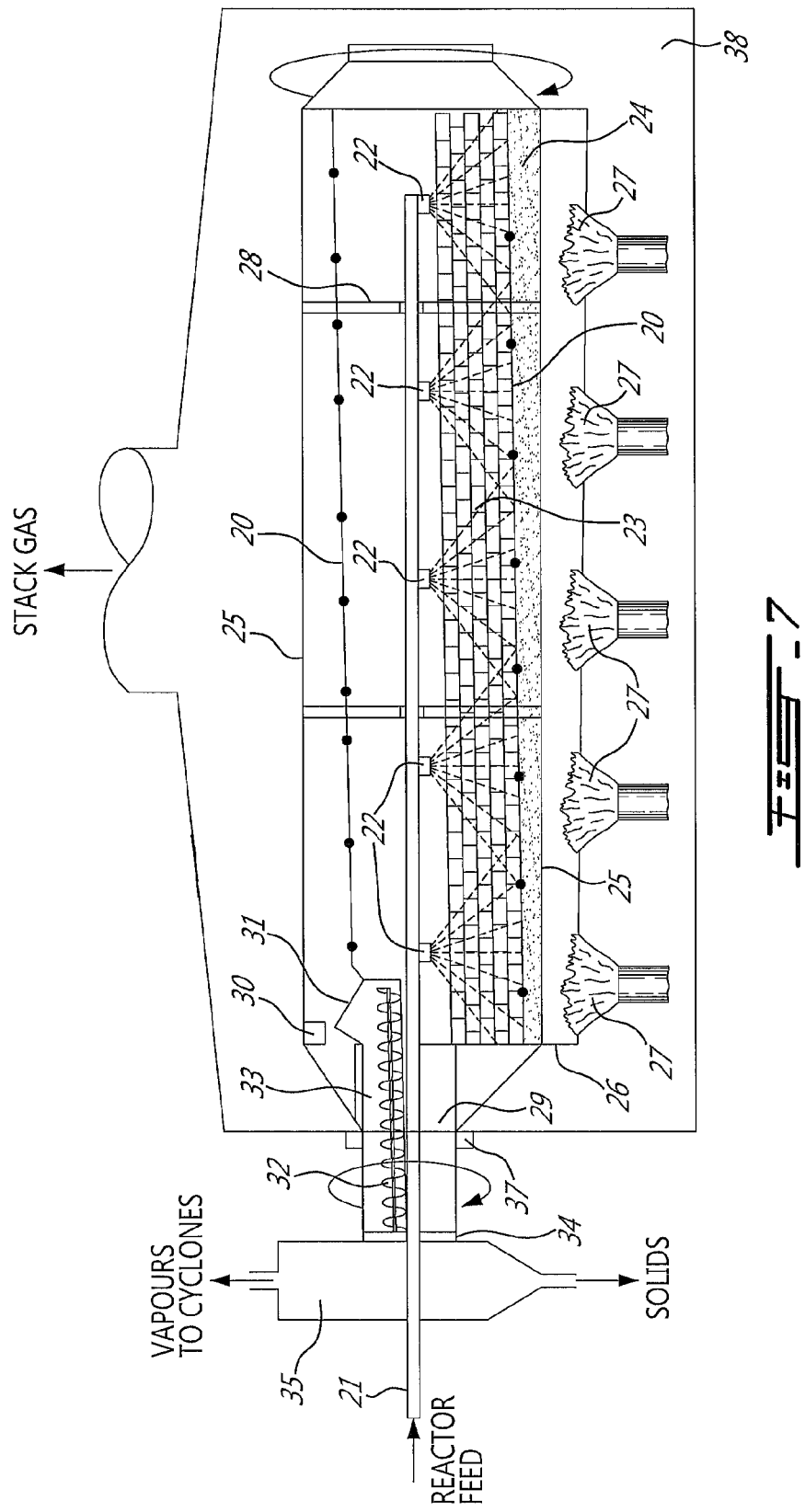

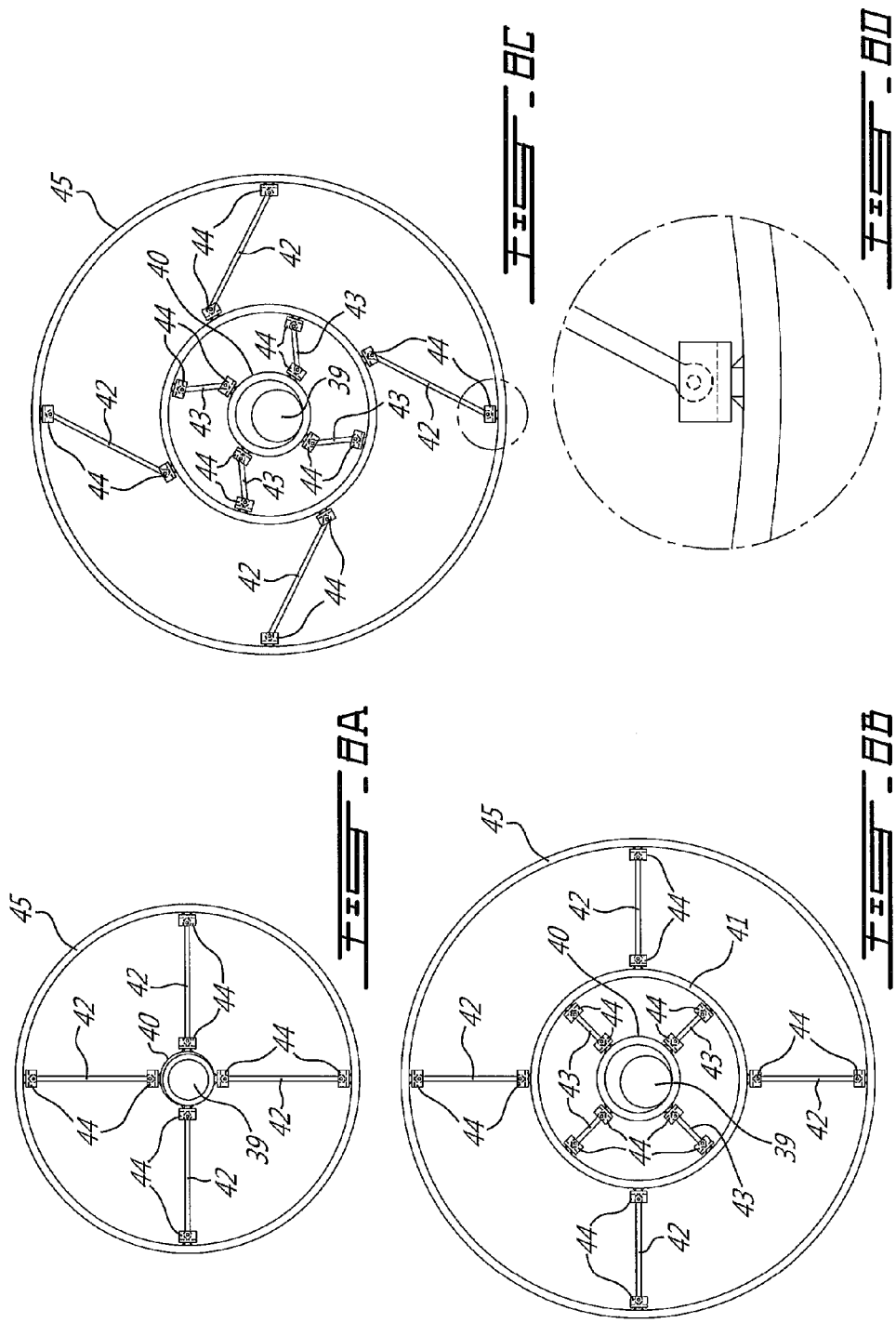

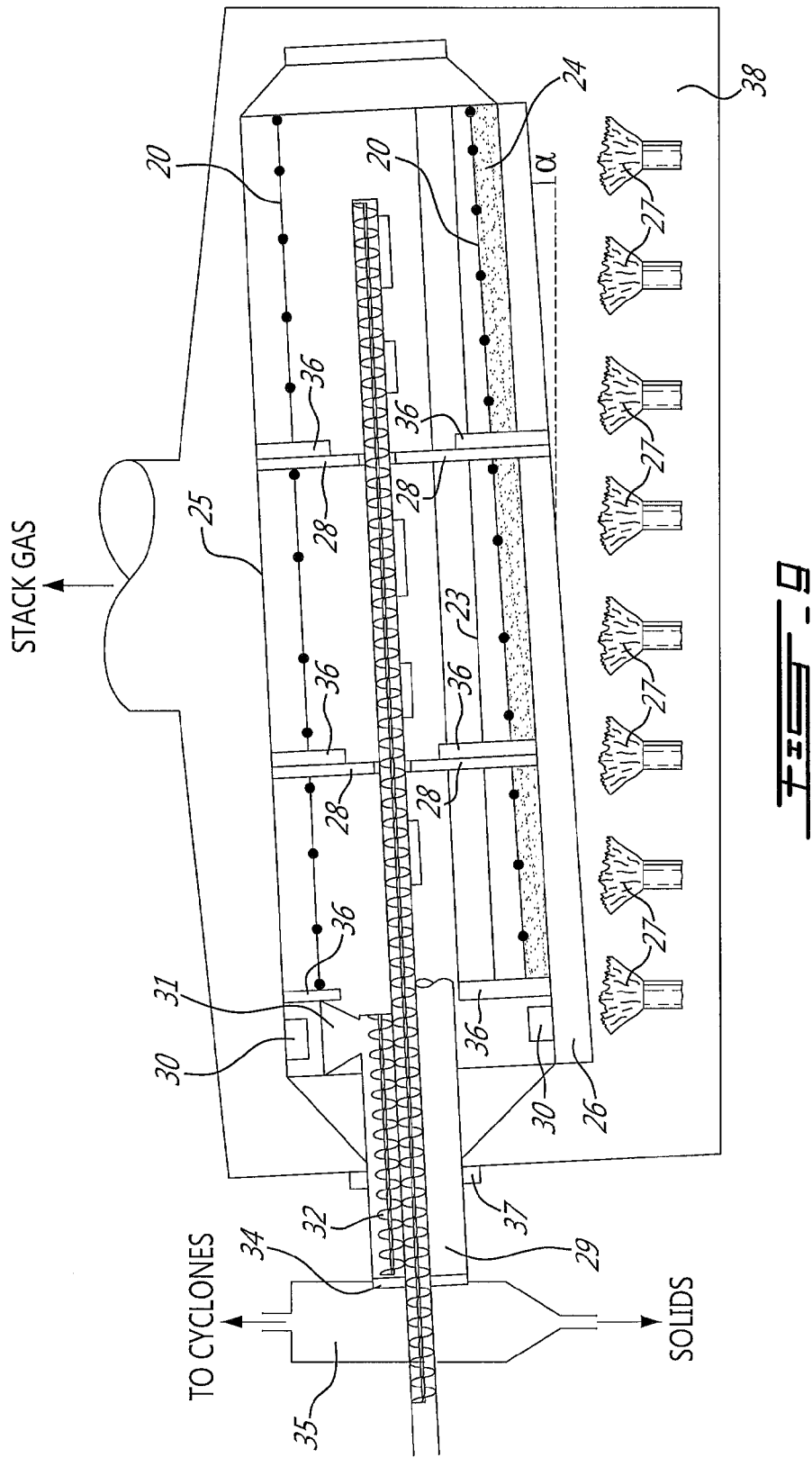

THERMAL PROCESS TO TRANSFORM CONTAMINATED OR UNCONTAMINATED FEED MATERIALS INTO USEFUL OILY PRODUCTS

The present application is a 35 USC 371 national stage entry of PCT/CA2013/050091 filed on Feb. 6, 2013. This document is hereby incorporated by reference in its entirety.

FIELD OF THE INVENTION

The invention relates to a process to thermally treat contaminated or uncontaminated feed materials such as contaminated or uncontaminated feed oils, more particularly such as used lubricating oils, waste oils, oily tank bottoms, heavy oils, rubber, plastics, marpol or bitumen, in a rotating kiln operating under pressure and/or with the injection of a gas, preferably with injection of a sweep gas into the reactor or into its feed stream. The treated feed material results after treatment and after cooling in at least one liquid phase that is preferably an essentially oily stream.

BACKGROUND OF THE INVENTION

Waste oils, especially used lubricating oils (ULO), are considered a threat to the environment, and is classified as a hazardous product in most jurisdictions. The Environment Protection Agency (EPA) states that: "One gallon of used lubricating oil can pollute a million gallons of water." There is a need for a viable and flexible process that can destroy the hazardous components of ULO and produce useful products with little or no by-products to dispose of in industrial landfills or incinerators.

There are many processes to treat waste oils. Up until the December 2001 report to the European Commission of the Environment by Taylor Nelson Sofres titled "Critical review of existing studies and life cycle analysis on the regeneration and incineration of waste oils", and the Nov. 19, 2008 European union directive, there was priority given to re-refining processes recycling waste oils into lubricating oils in the European Union as well as in the rest of the World. Consequently many re-refining processes were invented and used. The commercial re-refining processes used in Europe are described in the Taylor Nelson Sofres report. These and others are described in a book by Francois Audibert titled "Waste Engine Oils, Re-refining and Energy Recovery", (Elsevier, Amsterdam, 2006). Among the processes that regenerate ULO into lubricating oil base-stocks, some, such as the acid clay processes, were abandoned or legislated out because of the disposal costs, both financial and environmental, of the by-products such as spent acid and clays.

Lube oil regeneration processes, using solvent extraction or vacuum distillation as their primary process, require a finishing step, such as hydrotreating, which entails the purchase of hydrogen or building a hydrogen unit. Usually, the quality of their feedstock determines the quality of their products. Waste oil compositions are variable, and can change even within a shipment. Re-refining processes usually require extensive laboratory analyses of both the waste oil entering the plant, to determine the amount of chemicals to add in their pre-treatment processes, and of the product lubricating oils to ensure consistent product quality. Because of their high capital and operating costs, these plants must be close to large population centre and/or serve a large collection area, and usually require government subsidies to be viable.

When the used oil is to be used as fuel, chemical treatment of ULO to extract heavy metals, sulphur and chlorides is legislated and requires considerable laboratory analyses because of the constant variations in feedstock compositions.

In some very specific and rare applications, ULO is cleaned, dewatered, tested and its additive package is topped-off, before the lube oil is used again without leaving the plant site. Again, these applications require extensive laboratory analyses.

There is a need for a viable, safe and flexible process that can destroy the hazardous components in used oil while making products and by-products that are all environmentally friendly.

The re-refining processes alluded to in the previous section aim to recover lubricating oils from the used oil feed streams. There are processes that want to destroy the metal-containing additives in waste oils, and make environmentally acceptable products such as fuels:

Many of these patents propose stationary reactors, operating at atmospheric pressure:

Canadian Patents Nos. 1,309,370 and 2,112,097, and U.S. Pat. Nos. 5,271,808 and 5,795,462 (Shurtleff) disclose an apparatus and a method that are provided reclaiming a useful oil product from waste oil, such as used lubricating oil. The apparatus comprises an oil feed means, a boiler, a heater and a separating means. The heater is used to heat the waste oil in the boiler to a temperature such that heavier hydrocarbons remain unvolatilized, trapping contaminants therewith.

The separating means separates the volatilized lighter hydrocarbons from the unvolatilized heavier hydrocarbons and contaminants.

U.S. Pat. No. 5,871,618 and Canadian Patent No. 2,225,635 (Kong at al.) disclose an apparatus and a process for reclaiming fuel oil from waste oil. The apparatus comprises a thermal cracking unit for cracking the high boiling hydrocarbon material into lighter, lower boiling, material so as to separate hydrocarbon vapor products from viscous materials; a condenser/heat exchanger for condensing the hydrocarbon vapour products to the liquid state; a fuel stabilization unit for chemically treating the condensates so as to give an oil product and solid sediment; and a polishing unit for forming a high quality fuel oil by physically removing solid contaminants. According to the present invention, high quality fuel oil can be obtained together with an environmentally innocuous solid ash cake, through a simple and efficient process.

U.S. Pat. No. 5,362,381 (Brown et al.) discloses a process in which waste lubricating oil is reprocessed into commercially usable diesel fuel and naphtha by thermocracking. A thermocracker unit is fired with sludge removed from the principal pool of oil undergoing vaporization. The vapours are separated from liquids in a primary distillation tower with precisely controlled heating. Resultant vapours are partially condensed. Resultant liquids flow downward through a secondary distillation tower into a reboiler which is heated by a flue gas bypass with an auxiliary burner. Vapours leaving the secondary distillation tower are partially condensed and resultant fluids are passed to a light ends flash tank. Gases from the flash tank fuel the auxiliary burner. Liquids are collected and stored for selling as naphtha. Hot liquids are withdrawn from the reboiler and are immediately cooled to atmospheric conditions. Liquids within specification are stored in a diesel storage tank for further use and sale. Off-specification products are stored in a reflux storage tank and are pumped and heated and sprayed downward in the primary distillation tower for washing the tower and for reprocessing in the thermocracking unit. Some light ends are mixed with sludge in a storage tank. The mixture is pumped as sludge fuel to the burner in a fire tube in the thermocracking unit.

U.S. Pat. No. 5,885,444 (Wansborough et al.) discloses a process for thermally cracking waste motor oil into a diesel fuel product is provided. The thermal cracking process uses low temperature cracking temperatures from 625 to 725 degrees Fahrenheit with ambient pressure to generate a column distilled fraction of diesel fuel mixed with light ends, the light ends being flashed off to produce a high quality #2 diesel fuel. The process further provides for removal from the cracking vessel an additional product stream which, when filtered, is suitable for use as a #3 fuel oil and that can be further blended with a bunker oil to yield a #5 fuel product.

Canadian Patent No. 2,242,742 (Yu) discloses a process and apparatus for the reclaiming and re-refining of waste oils. The process comprises raising a temperature of a feed mixture of fresh waste oil and a recycled non-volatile residue to a range of 400 to 490 degrees Celsius for a time sufficient to cause pyrolysis of the heavy hydrocarbons contained in the feed mixture, but insufficient to permit substantial undesired polymerization, oxidation and dehydrogenation reactions to take place in the feed mixture; cooling the resulting pyrolized waste oil mixture to a temperature in the range of 300 to 425 degrees Celsius, and maintaining the temperature while allowing volatile components in the pyrolyzed waste oil mixture to evaporate, leaving a non-volatile residue containing the contaminants; condensing the evaporated volatile components to form a reclaimed oil product; and mixing the non-volatile residue with fresh waste oil to form more of the feed mixture and repeating the temperature raising, cooling, evaporation and mixing steps on a continuous basis, while continuing to condense volatile components evaporated from the pyrolyzed waste oil mixture. The apparatus comprises a heating unit, a container, a condenser and pumping equipment and piping. The process and apparatus of the present invention generate #2 diesel fuel, gasoline and coke from waste oil. In this patent, the reactor operates under positive pressure.

Among the problems common to stationary reactors in waste oil applications are coking of the reactor walls, which impedes heat transfer from the heat source to the oil to be treated, and fouling of the equipment, not only in the reactor but also upstream and downstream of the reactor.

U.S. Pat. No. 6,589,417 and Canadian Patent No. 2,314,586 (Taciuk et al.) disclose a process by which used oil is treated in a reactor to remove contaminants. The reactor comprises a rotating vessel housed within a heating chamber. The inside of the vessel is indirectly heated by conduction through the vessel walls. The vessel contains a permanently resident charge of non-ablating, coarse granular solids. Within the vessel, the oil is vaporized and pyrolyzed, producing a hydrocarbon vapour. Coke is formed as a by-product. Contaminants, such as metals and halides become associated with the coke. The coarse granular solids scour and comminute the coke to form fine solids. The fine solids are separated from the coarse solids and are removed from the vessel. The hydrocarbon vapours are separated from any fine solids and are routed to a vapour condensation system for producing substantially contaminant-free product oil. The contaminant-rich solids are collected for disposal. This process operates at a negative pressure in the reactor.

Rotating kilns, operating under vacuum, are suggested in processes designed to thermally crack bitumen, heavy oil, rubber tires, oil shale and oil sands, coal or refinery distillation column bottoms.

Canadian Patent No. 1,334,129 (Klaus) discloses an invention that relates to a process and apparatus for the pyrolysis of bitumen. The process involves spraying preheated bitumen into a generally horizontal cylindrical rotating reactor which is heated from the outside and which contains grinding bodies. The bitumen is heated to the pyrolysis temperature and thereby forms a gaseous product and a solid pyrolyzed coke. The solid pyrolyzed coke is removed from the reactor walls by the grinding bodies and the resulting small particles are continuously removed from the reactor through ports in the reactor wall.

EP-A1-0698642 (Hamon et al.) discloses a process by which carbon black is prepared by pyrolysis of rubber waste, pre-ground and freed from Fe, in the presence of steam, $CO_2$, a combustion gas, or a mixt of steam and an inert gas. Pyrolysis is in a rotating oven with indirect heating, with the pyrolysis zone at 600 to 110 degrees Celsius and removal of the prod. at 150 to 350 degrees Celsius. The grain size of the rubber is 2-5 mm. The gas is a mixt. of an inert gas, pref. $N_2$, and steam, with ratio by wt. of water to granulate of 0.1-10, and residence time of 15 seconds to 200 minutes. The steam pressure at the entrance to the pyrolysis zone is $1.33 \times 10-10$ Pa, and is made up to atmos. pressure, if the water pressure is not 10 Pa, by dilution with an inert gas ($N_2$, Ar or Kr), by $CO_2$, or by any other gas.

U.S. Pat. No. 4,473,464 (Boyer et al.) discloses a method for producing a distillable hydrocarbonaceous stream and carbonaceous agglomerates from a heavy crude oil by charging the crude oil and finely divided carbonaceous solids to a rotary kiln with the crude oil and carbonaceous solids being charged in a weight ratio from about 0.6 to about 1.5; tumbling the crude oil and finely divided carbonaceous solids in the rotary kiln at a temperature from about 850 degrees Fahrenheit to about 1000 degrees Fahrenheit for up to about 30 minutes to produce a vaporous stream and agglomerate particles containing a residual portion of the crude oil and finely divided carbonaceous solids; separating the agglomerate particles into a product portion of a desired particle size range and a recycle portion; grinding the recycle portion to produce the finely divided carbonaceous solids and heating the finely divided carbonaceous solids prior to recycling the carbonaceous solids to mixture with the crude oil, an improvement comprising: supplying at least a major portion of the heat required in the rotary kiln by heating the crude oil charged to the rotary kiln thereby eliminating the heating of the finely divided carbonaceous solids prior to recycling.

U.S. Pat. No. 4,439,209 (Wilwerding) discloses an apparatus for the continuous non-oxidative thermal decomposition of heat-dissociable organic matter to a solid carbon residue, particularly activated carbon, and a mixture of gaseous products, without substantial coking or tar formation. The apparatus involve a cylindrical rotating drum in a substantially horizontal position, into which feed material is introduced at one end and products recovered at the other end. An axial temperature gradient, increasing in the direction of flow, is maintained within the drum, enabling the exercise of a high degree of control over the reaction to fully convert the feed into the desired products.

Indirectly fired rotating kilns are usually considered inefficient means to convey heat into a reactor. Some propose heating the reactor feed with a hot stream. The hot stream can be circulating gas, liquid or solids.

U.S. Pat. No. 5,423,891 (Taylor) proposes a direct gasification of a high BTU content fuel gas from a hydrocarbon content solid waste material W which may include some glass content is effected by preheating heat carrier solids HCS in a flash calciner to a temperature capable of thermally cracking the hydrocarbon content of the solid waste material W directly into the high BTU content fuel gas. The HCS are separated from the products of combustion and fed into a gas sealed refractory lined horizontal axis rotary kiln retort concurrently with the solid waste W. Momentary contact and mixing of the solid waste W with the HCS in the rotary kiln in the absence of oxygen is sufficient to directly thermally crack the solid waste material into the high BTU gas product. Separated HCS are returned to the flash calciner for reheating. A trommel, coupled directly to the output of the rotary kiln retort and having a trommel screen with mesh openings smaller than glass agglomerates, but sized larger than the HCS, permits separation of the HCS and discharging of glass agglomerates from the downstream end of the trommel screen to prevent shut down of the direct gasification unit. Direct gasification of steel industry waste water treatment plant sludge, automobile shredded refuse ASR, municipal solid waste MSW and refuse derived fuel RDF and oil mill scale is effectively achieved, irrespective of glass content contaminant.

U.S. Pat. No. 4,512,873 (Escher) discloses a process in which the residues obtained in the hydrogenation of oil, especially heavy oil, or of coal are subjected to low temperature carbonization in a drum, preferably a rotary drum, at temperatures between approximately 400 degrees Celsius and approximately 600 degrees Celsius, by means of a carbonization gas after the separation of the condensable portions and heating to temperatures between approximately 600 degrees Celsius and approximately 950 degrees Celsius, which is introduced into the low temperature carbonization drum. The gas is heated to temperatures between approximately 600 degrees Celsius and approximately 950 degrees Celsius indirectly by flue gases arising from the combustion of oil or gas, for example, of excess carbonization gas. The residue to be carbonized at low temperature is introduced into the hot gas in a finely dispersed state and preferably atomized.

From a practical point of view, it is difficult to ensure the integrity of the seals of both the main reactor and the coke incinerator when there is a circulating stream of solids. When produced gas is circulated to heat the reactor feed oil to cracking temperatures, large amounts of circulating gas is required, compared to the fresh feed stream.

There is a need for a flexible and viable process that addresses the drawbacks of existing technologies and that can destroy the harmful components in waste oils while making products and by-products that are useful and environmentally friendly.

SUMMARY

A process for thermally treating a feed material, said process comprising:
a) at least one step performed in a rotating kiln having a positive pressure managing system and wherein in said process a sweep gas, that is an inert gas or a substantially non-reactive gas, is injected into the said rotating kiln or in the said feed stream entering the said rotating operating kiln; or
b) at least one step performed in a rotating kiln having a positive pressure managing system; or
c) at least one step performed in a rotating kiln wherein a sweep gas is injected in the rotating kiln or in the feed stream entering the said rotating operating kiln,
wherein in step a), or in b) or in step c), the conditions of the thermal treatment are managed in order that the exit stream, after cooling, results in at least one liquid phase that is preferably essentially an oily liquid phase.

Heavy oil, as obtained by a process thereby obtained. The use of a heavy oils thereby obtained in environmental or non-environmental applications.

BRIEF DESCRIPTION OF THE DRAWINGS

FIG. 2 represents a cross section, according to a plan perpendicular to the horizontal axis, of a reactor and the charge of metal plates and the shelves tacked on the kiln walls of a reactor according to a second embodiment of the present invention wherein the reactor cross section has only 4 shelves, each pushing two layers of enough plates to cover at least a quarter of the reactor wall.

FIG. 3 represents a cross section, according to a plan perpendicular to the horizontal axis, of a reactor and the charge of metal plates and the shelves tacked on the kiln walls of a reactor according to a third embodiment of the present invention, as described in the "Preferred Mode" section of this application, wherein the reactor has only one shelf.

FIG. 7 is a cross section of a reactor, according to an embodiment of the invention, in the horizontal position and wherein the feeding of the material to be treated and the exit of the vapours and the solids produced are both on the left side of the reactor.

FIG. 8A is a cross view of a first embodiment of the center ring supports for the feed line inside a cylindrical reactor of the invention, when the reactor is cool.

FIG. 8B is a cross view of a second embodiment of the center ring supports for the feed line inside a cylindrical reactor of the invention, when the reactor is cool.

FIG. 8C is a cross view of a third embodiment of the center ring supports for the feed line inside a cylindrical reactor of the invention, when the reactor is heated.

FIG. 8D is a detailed perspective view of the attachments means of the invention that allows the support beams to expand and rotate at their junctions points with the reactor walls and rings, when the reactor is heated.

FIG. 9 is vertical cross section of reactor according to an embodiment of the invention in a slanted position.

DESCRIPTION OF THE INVENTION

Preliminary Definitions

Figure 1:
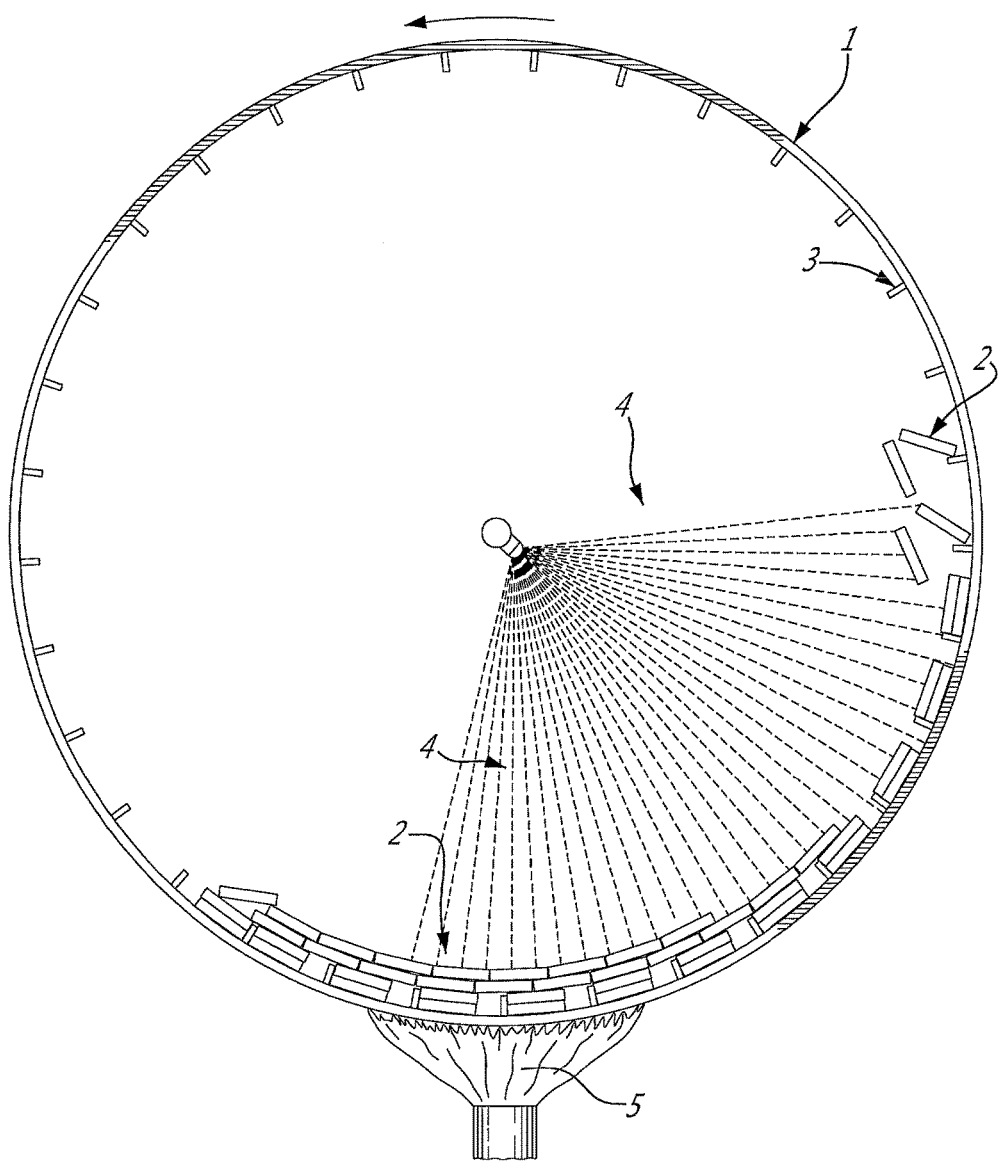
FIG. 1 represents a cross section, according to a plan perpendicular to the horizontal axis, of a reactor and the charge of metal plates and the shelves tacked on the kiln walls of a reactor according to a first embodiment of the present invention wherein the reactor cross section has 34 shelves. In this example, the shelves are spaced to allow for only two rows of plates per shelf, one layer against the reactor wall, the other against the first row.

For the purpose of this document, the following definitions are adopted:

"Feed material": contaminated or uncontaminated feed materials such as contaminated or uncontaminated feed oils, more particularly such as used lubricating oils, waste oils, oily tank bottoms, heavy oils, marpol, waxes and bitumen. Solid feedstocks could include oil sands, oil shales, and wastes such as rubber, plastics, asphalts and other organic chemicals or hydrocarbons.

"Sweep gas": any non-reactive or substantially non-reactive gas, preferably it is an inert gas such nitrogen, recycled reactor non-condensable gas or water steam. It was surprisingly found that such gas not only have as sweeping effect in the reaction zone of rotating operating reactor, but may help control the pressure in the reactor, may increase the safety in plant operations, may help control the reactions in the reactor and globally may improve the efficiency of the process. For example, the sweep gas is a gas stream that may additionally serve in various the following functions such as:

when injected into the reactor feed line, the sweep gas changes the density of the total feed stream; it changes the flow regimes within the feed line and/or nozzles, which results in lower incidence of fouling and plugging of the piping and spray nozzles, and in improved spray patterns; further, the sweep gas favours atomization of the oil stream before the oil reaches the reaction sites on the hot plates, and/or if introduced into the liquid feed at temperatures above that of the hydrocarbon liquid stream, it will increase the feed stream temperature and reduce the energy, or heat, provided by the kiln, and/or it reduces the oil's residence time in the reactor, by sweeping the hydrocarbon vapours out of the reactor soon after they are formed, thereby reducing the incidence of secondary reactions, or over-cracking, resulting in higher liquid yields and more stable liquid product oils, and/or the sweep gas present in the reactor reduces the liquid oil's partial pressure, and favours the vaporization of the lighter oil fractions, such as the gasoil and naphtha, in the feed and products; this also reduces over cracking in the gasoil fraction and increases the stability of the hydrocarbon liquid products, and/or the sweep gas helps to stabilize the pressure in the reactor, and/or when steam or nitrogen are used, the sweep gas reduces the risk of fires in the event of a leak in the reactor or in the downstream equipment; it will disperse the oil escaping and, hopefully, keep the oil from igniting, even if it is above its auto-ignition point, and/or it can also be part of the stripping gas stream in the product distillation unit.

"Contaminants": in waste oils, the most common contaminant is water. Other contaminants include, but are not limited to, sand, clay, engine wear products, and decomposition products from oils, greases and/or additives. Contaminants may also include wastes such as paint thinners, plastic bags, cooking oils or greases that may have been discarded in used oil depots.

"Diesel", "gasoil" or "fuel oil": in the context of this process are oils mainly made up of hydrocarbons with boiling points between 100 and 500 degrees Celsius, according to ASTM D-86 or to ASTM D-1160.

"Naphtha": light oil with a 90% point (ASTM D-86) around 160 degrees Celsius, and a specific gravity between 0.65 and 0.8.

"Used Lubricating Oil" (ULO): oils or greases that were used as lubricants, usually in engines, and were discarded. Examples would include car engine oils, compressor oils, and diesel engine oils among others. Lubricating oils generally contain additives, which are carefully engineered molecules added to base oils to improve one or more characteristic of the lubricating oil for a particular use. Used lubricating oil is classified as a hazardous product in many jurisdictions because of its additives and contaminants.

"Substantially non-reactive gas": is a gas such as nitrogen, recycled reaction gas, carbon dioxide or water steam that does not affect or enter into the thermal processing or that does not substantially combine with either the feed or reaction products in the reactor operating range, for example in a temperature range ranging from 350 to 850 degrees Celsius, in a temperature range up to 700 degrees Celsius, preferably up to 525 degrees Celsius.

"Waste oils": Oils or greases that are discarded. They include used lubricating oils (ULO) as well as a wide range of other oils such as marpol, refinery tank bottoms, form oils, metal working oils, synthetic oils and PCB-free transmission oils, to name a few.

"Consistent shapes": means shapes so they can stay on the narrow shelves and/or each other, while protecting the reactor wall from direct contact with the relatively cold feed. In the meaning of the invention, the expression consistent shapes also means:

a multiplicity of physical elements having substantially the same form;

a multiplicity of physical elements having substantially the same form and substantially the same size;

a multiplicity of physical elements having substantially the same size, provided those forms are compatible in such an extent that are globally symmetrical and stay substantially constant during rotating inside the rotating kiln; and a multiplicity of physical elements having shapes that permit that plates sit upon each other, preferably in such a way that there is no space or substantially no space between them.

"Dynamical wall": the multiplicity of plates of consistent shapes results, because of the rotation, in a continuously reconstructing wall.

"Thermal processing/thermally treating": is preferably any change in phase and/or composition, and/or reactions initiated or facilitated by the application, or withdrawal, of heat and/or temperature. Examples of thermal processing include evaporating, cracking, condensing, solidifying, drying, pyrolizing and thermocleaning. In the meaning of the invention the expressions Thermal processing/thermally treating preferably exclude combustion and more specifically apply in the context of indirectly fired rotating kiln.

"The height of a shelve": is the distance between the attachment point of the shelve on the reactor wall and the end of the shelve directed to the center of the reactor.

"The width of a shelve": is the measurement of the distance between the two sides of the shelve on a direction perpendicular to the height of the shelve.

In this process, the feed oil, which may have been chemically pre-treated, is heated and its water removed preferably in a flash evaporator. The dewatered oil may be heated again to a temperature close to, but below, its initial thermal cracking temperature. This heating step is accomplished either by heat exchange with a hot oil stream, by the injection of a hot gas, by direct contact with a hotter oil stream or solids stream, or by a combination of these methods. The resulting reactor feed stream is sprayed unto metal plates in a rotating kiln, where it is thermally cracked and/or vaporized. The reactor operates under positive pressure. The reaction products, hydrocarbon vapours and solid coke, are swept out of the reactor as soon as possible to prevent secondary reactions. Most of the coke is removed from the hydrocarbon stream, before the oil is condensed, usually in a box and/or cyclones. The residual coke is washed out for the hydrocarbon vapours preferably in a wash column or in a dephegmator. The hydrocarbon product stream is condensed and separated into specified products. The non-condensable gas, heated or non-heated gas and possibly the naphtha is (are) used as fuel on site.

More specifically, the first objet of the present invention is a process for thermally treating a feed material, the process comprising:
 a) at least one step performed in a rotating kiln operating under positive pressure managing system and wherein in the process a sweep gas, that is an inert gas or a substantially non-reactive gas, is injected into the rotating kiln or in the feed stream entering the rotating operating kiln; or
 b) at least one step performed in a rotating kiln having a pressure control system that keeps the reactor under positive pressure; or
 c) at least one step performed in a rotating kiln wherein a sweep gas is injected in the rotating kiln or in the feed stream entering the rotating operating kiln,
 wherein in step a), or in b) or in step c), the conditions of the thermal treatment are managed in order that the exit stream, after cooling, result in at least one liquid phase that is preferably essentially an oily liquid phase.

Advantageously, the rotating kiln is of the indirect fired kiln type. According to a preferred embodiment, the overpressure managing system is a pressure control system positioned at the entry and/or at the exit of the rotating kiln, for example the pressure control system is a device controlling a valve at the exit. The feed material is advantageously an oily feed material.

The process of the invention is particularly suited for thermally treating a feed material and for producing the following components: coke and non-condensable gas and/or heavy oils and/or wide range diesel oils and/or naphtha, each of those produced components being recovered separately or in the form of mixtures of at least two of these components.

Advantageously, the oily feed is selected among contaminated or uncontaminated oils such as waste oils, used lubricating oils, oily tank bottoms, Marpol, heavy oils, bitumen and other heavy oils, coal, oil sands, asphalts, chemically pre-treated oils or mixtures of at least two of the latter.

According to a preferred embodiment, the vapours and the solids exiting the kiln are routed to vapour solid separation means.

Advantageously, the vapour solid decantation means are a stationary box and/or a heated cyclone for the heavier solid and/or then are sent to an a cyclone(s) to separate most of the solids present in the vapours exiting the rotating kiln from the vapours.

According to a preferred embodiment, the solids present in the vapours exiting the rotating kiln are selected among: coke, metals, sand, dirt, asphaltens, preasphaltens, sulphurous compounds, heavy polymers such as gums and/or resin, salts, cokes containing various compounds such as sulphur, halogens and metals.

The vapour-solid separation equipment, preferably the separation box and/or the cyclones, is (are) preferably heated, at a temperature that is (are) above the temperature of the vapours exiting the kiln, more preferably this temperature is up to about 300 degrees Celsius, more preferably up to 200 degrees Celsius, advantageously up to about 20 degrees Celsius, more preferably up to 10 degrees over the temperature of the vapours exiting the kiln.

Advantageously, the vapour solid separation equipment, preferably the cyclones and/or the separation box, are heated at a temperature that is at least 10 degrees Celsius, and preferably at least 20 degrees Celsius, below the cracking temperature of the vapours.

The solid exiting the rotating kiln is advantageously a dry coke, i.e. this coke preferably contains less than 2 weight percent of oil.

According to a preferred embodiment, most, preferably more than 50%, more preferably more than 90%, of the coke is removed from the vapours exiting the rotating kiln, and, in the case wherein the feed oil is an used oil, up to 99.5% of the coke is removed from the vapour exiting the rotating kiln.

Advantageously, the vapours exiting the vapour solid separating equipment, such as cyclone(s), are partially condensed in a self-refluxing condenser and/or in a wash tower, to complete the solids removal from the reactor products.

According to a preferred embodiment, the vapours exiting the last set wherein solids are eliminated, preferably this step takes place at the top of the condenser and/or of the wash tower, are routed to product separation, while the recovered heavy oil containing the residual solids exits at the bottom.

Advantageously, the heavy oil, containing the residual, are recycled in the, preferably in a dewatering step when present, and/or in the oil feed entering at the beginning of the process, and/or in the reactor feed oil entering the rotating kiln.

According to a preferred embodiment, wherein the recovered heavy oil and the fractionator bottom oil can also be used as back flushing oils to clean fouled equipment.

Advantageously, the absolute pressure in the rotating kiln, ranges from 1 to 4 atmospheres, preferably this pressure ranges from 1.1 to 1.5 atmospheres and/or the feed oil is, before entering the rotating operating reactor, heated, preferably at a temperature that is at least 20 degrees Celsius under the cracking temperature of the feed oil.

According to a preferred embodiment, the water is removed from the feed oil before the feed oil enters the reactor, preferably in a flash evaporator.

The feed oil entering the rotating kiln may also be an oil that, due to its history and/or due to its origin and/or to reduce its metal content, was previously chemically treated, or slightly chemically treated, thus the feed oil may have been treated by at least one acid and/or by at least one base, the acid being advantageously a sulphur acid and/or a phosphoric acid.

According to an alternative mode, the feed oil is physically and chemically pre-treated before entering the process.

Advantageously, the heating step(s) is(are) accomplished in a heater and/or by heat exchange with a hot oil stream, a hot thermal fluid, by the injection of a hot gas, by direct contact with a hotter oil stream, or by a combination of at least two of these methods.

Alternatively, the reactor feed stream resulting from the heating of the feed oil is, sprayed unto metal plates in a rotating kiln that contains metal plates, wherein it is thermally cracked and/or vaporized.

The reaction products that exit the rotating kiln, advantageously comprises hydrocarbon vapours and other vapour present in the reaction zone of the rotating operating kiln and solid coke.

Advantageously, the reaction products exiting the rotating operating kiln are swept out of the rotating operating reactor as soon as possible, preferably in 5 seconds to 60 minutes, more preferably in about 5 minutes. Reactor residence time is a function of the feed oil composition, of the pressure in the reactor, of the temperature, the sweep gas amount and composition, and/or of the desired products slates.

According to an alternative embodiment of the process, the reaction products, when swept out of the rotating, are heated at a temperature that is advantageously slightly over the temperature at the exit of the reactor.

Advantageously, most of the coke is removed from the hydrocarbon stream exiting the rotating kiln, before the oil is condensed preferably in a vapour/solid separator and then advantageously in cyclones and/or in a wash tower and/or in a self-reflecting condenser.

According to a preferred embodiment, the hydrocarbon product stream is condensed and separated into specified products and/or at least part, and preferably all, the non-condensable gas produced in the rotating operating kiln is used as fuel on site and/or at least part, and preferably all, the naphtha present in the feed oil and/or produced in the rotating kiln is used as fuel on site.

Advantageously, the sweep gas is superheated steam and/or the sweep gas represents in weight up to 30% of the weight of the feed oil, more preferably up to 10%, and more preferably between 0.5 and 5% of the weight of the feed oil.

According to an alternative embodiment, the cyclones are outside of the rotating operating reactor but inside a second enclosure, the second heated enclosure communicating or not with the first reaction's zone in order to benefit of a hot flue gas flow surrounding the cyclones.

According to a preferred embodiment, at least part of the purified oils recovered is used on the site to clean the heat exchanger(s).

Advantageously, wherein the residence time in the rotating kiln ranges from 5 seconds to 15 hours, preferably from 1 minutes to 15 hours, and this time is preferably comprised between 2 minutes and 30 minutes. At least part of the purified recovered oil may be used on the site or sold to clean heat exchangers and/or any other fouled equipment.

According to a preferred embodiment, the demetallisation of the total oil liquid products (heavy oil, wide range diesel and naphtha) recovered during the process is of at least 85%, preferably of at least 90% and more preferably of at least 95%.

Advantageously, the total recovered oil contains less than 60 PPM of metals.

According to another preferred embodiment, the metals mainly present in the recovered total oil products are mainly copper, iron and zinc, the other metals being at a level that is inferior to 1 PPM and/or chrome, vanadium, cadmium, nickel and lead, originally present in the feed stream, being during the process mainly concentrated in the recovered coke, the concentration may reach up to 99% wt.

Alternatively, the main components in the recovered gas are non-condensable gas such as steam, methane, ethane, ethylene, propane, propylene, butane butylene, pentane, other hydrocarbon gases, nitrogen, carbon monoxide, carbon dioxide and gas containing sulphur and halides.

Advantageously, the gas and the naphtha produced are used as fuel on site to satisfy the energy self sufficiency of the plant in function.

According to another preferred embodiment, the recovered oil is characterized in that is has no sulphurous content or less than 3 000 ppm of the sulphur in the mixture. Sulphur content in the liquid products depends on many factors such as the sulphur content in the feed, on the reactor operating conditions, on the efficiency of the solids removal from the reactor product stream.

Alternatively, Marpol is injected in the feed oil that is preferably of the type present at the bottom of a ship fuel tank and the amount of Marpol represents from 0 to 100% wt., preferably from 10 to 95% of the weight of the feed oil.

According to a preferred embodiment, the rotating kiln used in the process of the invention contains a charge made of plates and at least part of the surface of the plates is used to perform the thermal treating.

Advantageously, the thermal processing is performed on at least part of the surface of the plates in movement.

The processes of the present invention are particularly suited for the thermal processing of a mixture, wherein thermal processing being performed on at least 5%, preferably on at least 10% of the surface of the plates and/or on at least 5%, preferably on at least 10% of the plates.

Advantageously, the plates when moving inside the reactor clean the walls of the reactor and/or the plates protect at least part of the walls of the reactor and avoid reactor wall failure due to hot pots and/or thermal shock.

According to a preferred embodiment, the plates contribute to the uniformity of temperatures conditions in the reactor and/or the plates contribute to the heat transfer taking place from the heated walls to the surface of the plates, particularly on the surfaces of those plates wherein thermal processing occurs and/or the plates contribute to avoid spraying of cold mixtures on the heated walls of the reactor, and avoid reactor wall failure due to thermal shock.

According to another preferred embodiment of the invention, the reactor comprises:

a. a rotating kiln;
b. a heating system;
c. at least one shelf on the reactor wall;

d. a charge of plates of consistent shapes;
e. means for bringing the mixture to be thermally processed on the surface of at least part of the plates;
f. means for removing the fine solids from the reactor, preferably either through entrainment with the exiting vapours, or through a separate solids exit, or both;
g. means for recovering the reaction and straight run products; and
h. means for venting the gas obtained by the thermal processing outside the reactor zone.

Preferably, the at least one shelf being either parallel to the center axis of the reactor, when the reactor is horizontal, or slanted with respect to the center axis when the reactor is slanted or not slanted. In an alternative embodiment of the invention, shelves are at least partially replaced by a row of pegs or protuberances to support the plates.

Preferably, at least one shelf is placed on the reactor wall in such a way to keep a uniform distribution of the plates along the reactor length, and more preferably, the at least one shelf is either parallel to the center axis of the reactor, when the reactor is horizontal, or slanted with respect to the centre axis when the reactor is slanted or not slanted.

Advantageously, the means for bringing the mixture to be thermally processed on the surface of at least part of the plates, bring the mixture on the surface of at least more than 10% of the plates, preferably on the surface of at least more than 30% of the plates, and more advantageously on the surface of about 50% of the plates present in the reactor.

The mixture to be thermally processed is advantageously a liquid, gas and/or solid and/or is a mixture of at least two of these, preferably the mixture comprises mostly organic compounds that may be transformed by thermal processing, more preferably the mixture comprises at least 80%, preferably at least 90%, more preferably at least about 95% of organic compounds that may be transformed by thermal processing.

The process of the invention is advantageously used for treating mixtures that are contaminated soils and/or bitumen that preferably comprise up to 100%, preferably at least 5%, of organic compounds that may be transformed by thermal processing; advantageously in the case of oils sands and shale oils, the mixtures have only 5 to 12% oil, the remaining being sand/or earth or shale.

Advantageously, the process is used to treat mixtures that may comprise other components that are not organic compounds and/or that may not be transformed by thermal processing.

Said other components, alone or in a combination, may be selected among: water, steam, nitrogen, sand, earths, shale, metals, organic salts, inorganic salts, inorganic acids, organic acids, organic basis, inorganic basis, lime, organic gas and inorganic gas that won't be transformed in the reactor and among mixtures of at least two of these components.

Advantageously, the treated mixtures are composed of organic compounds that may be transformed by thermal processing in: a liquid phase, a gaseous phase, a solid phase, or in a combination of at least two of these phases and/or the mixture are mostly composed of organic compounds that may be transformed by thermal processing, in at least a liquid phase, a gaseous phase and a solid phase.

According to a preferred embodiment, the reactor feed oil is substantially free of an organic liquid and of a slurry phase.

The processes of the invention, may operate in less than 10% vol., preferably in less than 5% vol. of an organic solid, and/or liquid and/or of a slurry phase and/or operate in the absence of an organic solid, liquid and/or slurry phase.

In the processes of the invention, the rotating kiln rotates around its centre axis, the axis is horizontal or slanted.

Advantageously, the rotating kiln rotates around its centre axis, the axis forming with the horizontal an angle that is less than 45 degrees, preferably less than 30 degrees and more preferably this angle is about 5 degrees and more advantageously the angle is of 0 degree.

According to another preferred embodiment, the center axis of the rotating kiln is horizontal or slanted and the angle is maintained constant except in the case wherein solid agglomeration occurs or when the reactor is cooled down after operation and/or the walls of the reactor are directly and/or indirectly heated.

Advantageously, the inside of the reactor is directly and/or indirectly heated and/or the heat source is generated by electricity, a hot oil and/or gas stream, or obtained from the combustion of gas, naphtha, other oily streams, coke, coal, or organic waste or by a mixture of at least two of these.

The inside of the reactor may be indirectly heated by an electromagnetic field and/or the inside of the reactor is directly heated by a hot gas, liquid or solid stream, electricity or partial combustion of the feedstock, coke, products or by-products.

According to a preferred embodiment, the heating means comprises at least one heating system external to the walls of the reactor which is usually the case of an indirectly fired kiln.

Alternatively, the external walls of the reactor may be partially surrounded by, or exposed to, one or more burners and/or exposed to combustion gas and/or hot solids.

The walls of the reactor are advantageously surrounded by a fire box, and the fire box is stationary and may contain one or more burners.

According to another preferred embodiment, one or more shelves are attached to the internal walls or the external walls of the reactors and/or the shelve (s) is (are) are attached to the wall of the reactor in a way allowing for the thermal expansion of the shelves with minimum stress on the reactor walls and on the shelve(s).

Advantageously, the shelve(s) is(are) held by T shaped clamps and/or the shelve(s) is(are) symmetrically attached to the internal wall of the reactor and/or the shelve(s) is(are) attached to the internal wall in a designed and/or random pattern of the reactor.

According to another preferred embodiment, the number of shelve(s) that is(are) disposed, per square meter of the internal surface of the reactor, on the internal wall of the reactor ranges from 1 to 40, preferably from 2 to 20 and/or the number of shelve(s) that is(are) disposed, per square meter of the internal surface of the reactor, on the internal wall of the reactor ranges from 1 to 50 units, more preferably from 2 to 20, advantageously from 3 to 15 and this number is more advantageously about 4.

The number of shelves in the reactor may depend on the weight of the plates and/or on the maximum operating temperature of the reactor wall and/or on the material the shelves and plates are made of.

Advantageously, the space between two shelves represents from 0 to 100%, preferably this space from 5 to 100% of the radius of the cylinder.

Alternatively, the space between two shelves represents from 10 to 100% of the radius of the cylinder; this space is preferably about 25% of the radius of the reactor that is preferably a cylinder.

The distance between two shelves represents from 5 to 100% of the circumference of the inner wall of the reactor that is preferably a cylinder, more preferably a cylinder with conic ends.

Advantageously, the distance between two shelves represents from 10 to 100%, this space being preferably about 25% of the circumference of the inner wall of the reactor that is preferably a cylinder.

The processes of the invention wherein the form of the shelves in the rotating reactor is selected in the group constituted by flat, concave, convex, spiral and slanted are of a particular interest.

Advantageously, the shelves are slanted in relation to the reactor axis, the angle between the reactor axis and the shelves is the same as that between the reactor axis and the horizontal, and preferably the angle between the reactor axis and the horizontal can range from 0° to 30° and is more preferably 0°.

Advantageously, the height and/or the width of the shelves is calculated and depends on at least one of the following parameters: the space between the shelves, the space between the supports (the "T" brackets), the material the shelves are made of and the weight of the plates, more preferably, the height or width of the shelves ranges from 1 to 8 cm.

According to a specific embodiment, the height or width of the shelves ranges from 1.5 to 4 cm, and the width is preferably about 2.5 cm, more preferably about 2 and/or the width and the height of the shelves are selected in order for the shelves to be able to retain 2 to 3 plates.

The height of the shelves is, advantageously, at least about the thickness of the plates, preferably about twice the thickness of the plates and/or the shape of the plates of the charge is selected among the group of parallelograms, such as square, rectangles, lozenges, or trapezes.

According to a preferred embodiment, the plates of the charge are rectangular, triangular, hexagonal or octagonal and/or the shape of the plates of the charge is perfect or imperfect, or about perfect.

Advantageously, all the plates present in the reactor have about the same size and shape.

According to another preferred embodiment of the invention, the volume of the plates of the charge present in the reactor represents from 1 to 25% of the internal volume of the reactor and/or the volume of the plates of the charge present in the reactor represents about 4%, of the internal volume of the reactor.

Advantageously, the charge of the reactor is constituted by flat and/or slightly curved metal plates of consistent thickness and shape and/or by plates having a melting point which is at least of 100 degrees Celsius, and more preferably is of at least 150 degrees Celsius above the reactor wall maximum operating temperature in the thermal processing zone.

According to a preferred embodiment, the rotating reactor used is characterized by plates are heavy enough to scrape coke or other solids off the reactor wall and/or off other plates, more preferably each plate has a density that is superior to 2.0 g/cm$^3$, preferably superior to 2.0 g/cm$^3$ and more preferably comprised between 5.5 g/cm$^3$ and 9.0 g/cm$^3$.

Advantageously, the means for bringing the mixture in contact with at least part of the surfaces of the plates are spraying means and/or a conveyor, more advantageously, the means for bringing the mixture in contact with at least part of the surfaces of the plates are spray nozzles that spray the mixture onto the surface of the plates of the charge when the feed stream is liquid and/or is mixture of liquid and/or gas.

The means for bringing the solids outside the reactor is (are) advantageously entrainment with the product gas, scoop(s), screw conveyors and/or gravity.

The means for bringing the solid outside the reactors advantageously comprise an exit hopper arrangement attached to the solids exit tube.

According to another preferred embodiment, the reactor has two exits: one for the solids and one for the gas/vapours and entrained solids obtained.

Advantageously, the gas/vapours obtained during the thermal processing contain entrained solids.

Additionally, the reactor is equipped with means for avoiding accumulation of solid in the reactor and/or for plugging of any of the exits.

Advantageously, the means for avoiding accumulation are a screw conveyor in the solids exit tube, or a slanted solids exit tube and/or the reactor is a cylinder, or a cylinder with two conic extremities, or two cones attached by their basis, or a sphere.

In a preferred embodiment, the reactor is a heated cylinder having a length to radius ratio ranging from 1 to 20 and preferably ranging from 2 to 15, more preferably this ratio is about 10 or about 5.

According to another preferred embodiment of the invention, the processes of the invention are performed with a feeding line positioned about the longitudinal central axis of the reactor, the feeding line being attached to the internal walls of the reactor by attachment means that allow the feeding line to stay immobile despite the rotational movement of the reactor. The attachment means thus preferably comprise a tube and/or at least a ring surrounding the feeding line, the surrounding tube and/or surrounding ring(s) being attached to the internal wall of the reactor and leaving at least part of the feeding line not surrounded.

The diameter and/or the constituting material of the surrounding tube and/or of the surrounding ring(s) is (are) advantageously selected in order to allow the thermal expansion of the feeding line support ring.

According to an embodiment of a particular interest, the attachment means comprise a second tube and/or at least a second ring surrounding the first tube and/or the at least first ring surrounding the feeding line, the second surrounding tube and/or the surrounding ring(s) being attached to the internal wall of the reactor and to the external surface of the first tube and/or of the at least first ring surrounding the feeding line and leaving at least part of the feeding line not surrounded by support rings.

Advantageously, the length of the attachment means of the second tube and/or of the at least a second ring is about the distance between the external wall of the second tube and/or of the at least a second ring to the internal wall of the reactor; more preferably, the length of the attachment means of the second tube and/or of the at least a second ring is superior, preferably for at least 10%, more preferably superior for at least 20%, to the distance between the external wall of the second tube and/or of the at least a second ring to the internal wall of the reactor.

Advantageously, the length of the attachment means of the first tube and/or of the at least first ring to the second tube and/or to the at least a second ring is about the distance between the external wall of the first tube and/or of the at least first ring to the internal wall of the second tube and/or to the at least a second ring.

According to another preferred embodiment, the length of the attachment means of the first tube and/or of the at least first ring to the second tube and/or to the at least a second ring is superior, preferably for at least 10%, more preferably for at least 20% to the distance between the external wall of the first tube and/or of the at least first ring to the internal wall of the second tube and/or to the at least a second ring.

Advantageously, some, preferably each, of the attachment means are articulated to their attachment point.

According to another preferred embodiment, the reactor feed is made laterally trough one end of the reactor, and the exits of the vapours obtained during the thermal processing is positioned on the same end or at the opposite end of the reactor.

Advantageously, the reactor feed is made laterally trough one end of the reactor, and the exit of the cokes obtained during the thermal processing is positioned on the same end or at the opposite end of the reactor.

The reactor feed is advantageously made laterally trough one end of the reactor, and the exits of the vapours obtained during the thermal processing is advantageously positioned on the same end or at the opposite end of the reactor.

According to a preferred embodiment, the rotating kiln used to perform the process of the invention has heating means inside allowing the thermal processing to occur on the plates that are heated on the external walls of the kiln. In this configuration, the shelves are advantageously attached to the exterior surface of the kiln and/or the external walls of the kiln face the internal wall of the stationary housing.

The feeding of the mixture is advantageously performed on the top of the reactor and preferably is at equal distance of each end of the reactor.

The exit of the vapour is advantageously positioned on a side of the walls of the reactor and preferably at equal distance of both ends of the reactor.

According to another preferred embodiment, the exit of the coke is positioned on a side of the walls of the reactor and preferably at equal distance of both ends of the reactor.

Advantageously, the exit of the solids is on the bottom of the reactor and preferably is at equal distance of each end of the reactor.

Those processes of the invention wherein the continuous or semi-continuous thermal treating of the feed oil is performed are of a particular interest.

The processes of the invention are of a particular interest when applied to the treatment of feed oils which comprises organic compounds having the following thermodynamic and physical features: a specific gravity as per ASTM D-4052 between 0.75 and 1.1, and/or distillation temperatures, as per ASTM D-1160, ranging from −20 to 4 000 degrees Celsius, more preferably ranging from 20 to 950 degrees Celsius.

The average residence time in the rotating kiln ranges advantageously from 5 seconds to 10 hours, preferably between 30 seconds and 2 hours, and more preferably is between 90 seconds and 10 minutes.

According to another preferred embodiment, the average oil and feed oil residence time in the rotating kiln is, when:
- a positive pressure is present in the rotating kiln, comprised between 0.5 seconds to 2 hours; or more preferably between 1 and 10 minutes for used lubricated oil and comprised between 2 and 15 minutes for heavy oils;
- nitrogen as sweep gas is injected in the feed stream in an amount up to 15% wt., preferably in an amount up to 10% wt., more advantageously in an amount up to 7% wt., more preferably comprised between 5 seconds and 15 minutes, preferably between 8 and 10 minutes; and
- water steam is injected in the feed stream in an amount up to weight 10% wt., preferably in an amount up to 5% wt., more advantageously up to 3% wt., more preferably comprised between 0.5 minutes and 15 minutes, preferably between 4 and 5 minutes.

The heating temperature in the rotating kiln may range advantageously from 350 to 750 degrees Celsius.

Preferably the heating temperature on the surface of the plates in the reactor ranges from 390 to 500 degrees Celsius, more preferably from 420 to 455 degrees Celsius and, more advantageously, is:
- about 425 degrees Celsius particularly when used lube oils are treated;
- between 250 and 500 degrees Celsius, preferably between 300 and 400 degrees Celsius, when vegetal oils or animal fats are treated.

According to another preferred embodiment, the heating temperature in the reactor ranges from 500 to 520 degrees Celsius, an is preferably about 505 degrees Celsius, more preferably about 510 degrees Celsius particularly when shredded tires, bitumen, heavy oils, contaminated soils or oil sands or soil contaminated with heavy oils are treated.

The rotation speed of the rotating reactor advantageously ranges from 0.5 rpm to 10 rpm.

The rotation speed of the rotating reactor depending on the size of the reactor and on the process requirements, may advantageously range from ranges from 1 rpm to 10 rpm, preferably 2 to 5 rpm from and is more advantageously about 3 rpm, for example in the case of a reactor treating 400 barrels of used oil per day.

According to a preferred embodiment of the process of the invention, the various fractions generated by the thermal processing are recovered as follow:
- the liquid fraction is recovered by distillation;
- the gaseous fraction is recovered by distillation; and
- the solid fraction is recovered for example in cyclones, a solids recovery box, a scrubber, a wash tower and/or a self-refluxing condenser.

Preferably are those processes wherein
- the amount of the recovered liquid fraction represents between 85% and 100% weight of the organic reactor feed; and/or
- the amount of the recovered gaseous fraction represents between 0% weight and 10% weight of the reactor feed; and/or
- the amount of the recovered solid fraction represents between 0% weight and 5% weight,
- when the feedstock is used lubricating oil The processes are advantageously operated in a continuous or in a batch mode.

A second object of the present invention is constituted by non-environmental and by environmental uses of the processes defined in the first object of the present invention.

Among those uses, those:
- treating wastes oils such as used lubricating oils, form oils, metal treating oils, refinery or transportation oil tank bottoms; and/or
- destroying hazardous and/or toxic products; and/or
- reusing waste products in an environmental acceptable form and/or way; and/or
- cleaning contaminated soils or beaches; and/or
- cleaning tar pit; and/or
- recovering energy and/or fuels from used tires and/or plastics;

recovering energy and/or fuels from wood chips and/or paper;
use in coal-oil co-processing; and/or
recovering oil from oil spills; and/or
PCB free transformed oils, are of a particular interest.
Those for treating used oils and to prepare:
a fuel, or a component in a blended fuel, such as a home heating oil, a low sulphur marine fuel, a diesel engine fuel, a static diesel engine fuel, power generation fuel, farm machinery fuel, off road and on road diesel fuel; and/or
a cetane index enhancer; and/or
a drilling mud base oil or component; and/or
a solvent or component of a solvent; and/or
a diluent for heavy fuels, bunker or bitumen; and/or
a light lubricant or component of a lubricating oil; and/or
a cleaner or a component in oil base cleaners; and/or
a flotation oil component; and/or
a wide range diesel; and/or
a clarified oil; and/or
a component in asphalt blends, are also of a particular interest.

A third object of the present invention is a process for fabricating a plant comprising a rotating reactor and its internals for thermal processing according to the first object of the present invention, which process comprises assembly by known means the constituting elements of the reactor. Advantageously, the known assembling means comprise screwing, jointing, riveting and welding.

A fourth object of the present invention is the heavy oil, as obtained by a process defined in the first object of the present invention.

Heavy oils thereby obtained are polarized hydrocarbons and/or non-polarized hydrocarbons or mixtures of latter, and in those mixtures mainly made of hydrocarbons wherein at least part of the mixture of hydrocarbons includes polarized hydrocarbons, are of a particular interest.

Heavy oils thereby obtained and wherein the polarized hydrocarbons are selected in the family constituted by the polarized hydrocarbons having, according to ASTM method number D 1160, a boiling point range between 160 and 800 degrees Celsius, more preferably between 300 and 500 degrees Celsius, are also of a particular interest.

Among those heavy oils, those having a density, according to ASTM method number D4052, at 20 degrees Celsius, that ranges from 0.9 and 1.2 grams per milliliter, are advantageous and those containing less than 10% wt. of solids are more preferred.

Another family of heavy oil thereby obtained are those wherein the solids are selected in the family constituted by:
  i. carbon residues, corresponding to a carbon coke ASTM D189 that is preferably lower than 5% wt., more preferably lower than 3% wt.;
  ii. sulphurous compounds wherein the sulphur content of the heavy oil is, according to ASTM D5291, lower or equal to 5% wt., above usually in the order of 1.5% wt.

A fifth object of the present invention is constituted by the use of the heavy oils obtained by a process defined in the first object of the present invention or by the use of a heavy oil defined in the third object of the present invention:
  a fuel oil;
  a component of flotation oils or cleaning oils for equipment;
  a diluent for asphalt;
  a secondary refinery feed (preferably in a hydrocracking unit) to produce diesel and other fuels;
  a transformer oil without PCB;
  a water repellent additive in asphalt and/or cement;
  a cleaner to remove dirt containing polarized particles such as, asphalts and/or resins and/or metal particles attached to equipment walls, in such a use the used oil is preferably heated at temperature ranging preferably from 0 to 400 degrees Celsius, and more preferably below its auto-ignition points (advantageously 20 degrees Celsius under its auto-ignition point), and has a total hash metal content that is advantageously below 3% wt., preferably below 1 000 ppm wt., more preferably below 600 ppm wt. more preferably bellow 60 ppm wt.;
  as substitute to creosol, particularly in the preventive treatment of supporting railways wood beam; and
  in the same application than the original use of the oil before its contamination.

PREFERRED EMBODIMENTS OF THE INVENTION

Figure 15:
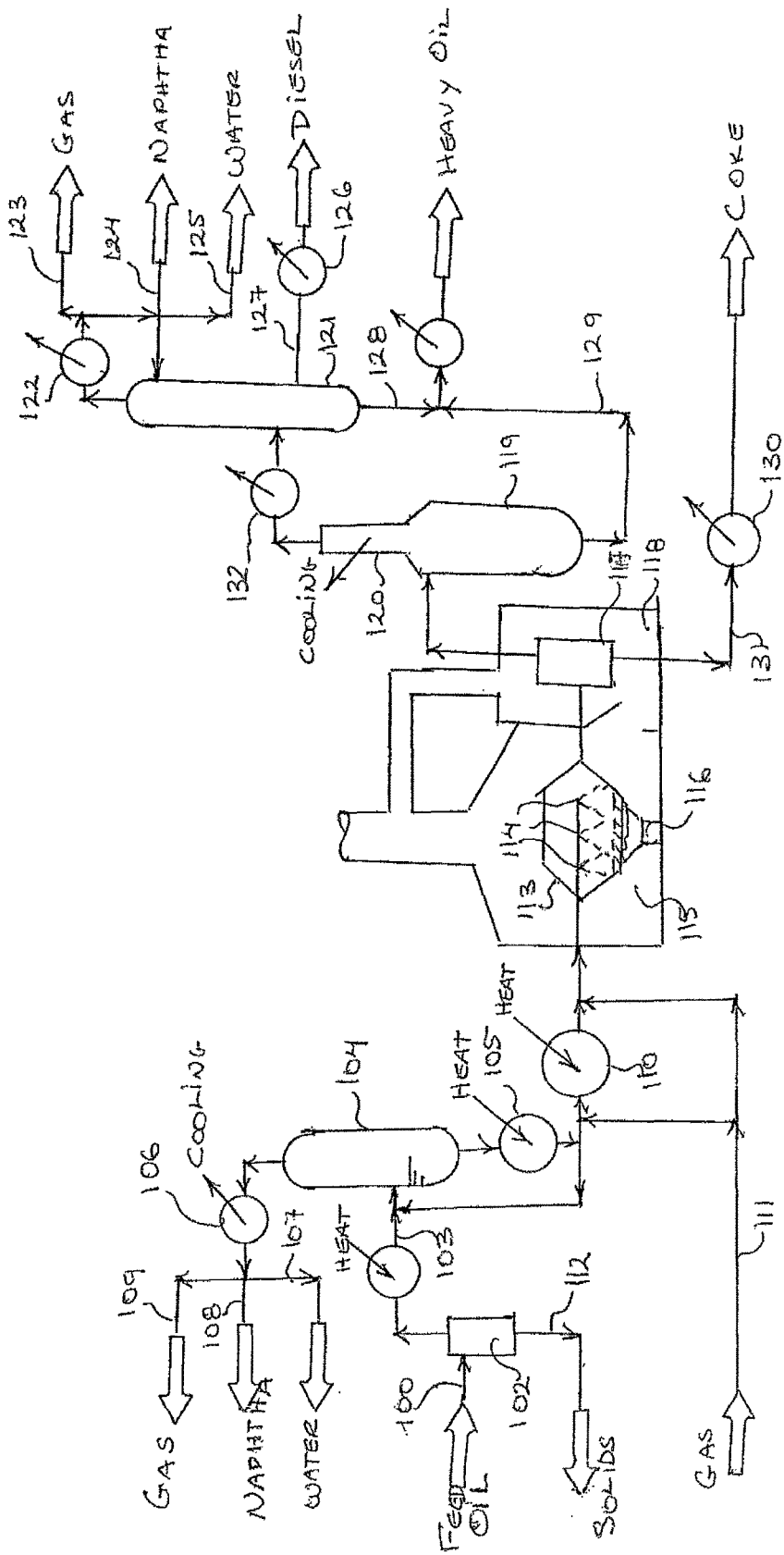
FIG. 15 is a simplified flow diagram illustrating a version of the process according to the present invention.

FIG. 15 is a simplified flow diagram illustrating a version of the process.

The waste oil feedstock can contain up to 20% water in an emulsion, and up to 10% naphtha. Free water should be separated at the tank farm. The feed oil can be chemically pre-treated before entering the plant, however, it is usually not required.

The feed oil (100) is filtered (102) and heated to approximately 90 degrees Celsius (103). If necessary, the waste oil feedstock may be filtered again or put through a decanter to remove as much solids (112) as possible before entering the dewatering unit. The feed oil is sprayed into a pre-flash drum (104) where a pool of oil is kept hot by means of a re-boiler heater (105). The water and naphtha in the feed oil are evaporated and exit the flash drum from the top of the vessel. The water and naphtha are cooled and condensed (106) and the water (107), naphtha (108), and possibly the gas (109) are separated and pumped to the tank farm and/or are used as fuel on site. The de-watering system can operate at pressures up to 100 kPa gauge, preferably at pressures up to 90 kPa gauge, and with hot oil temperatures up to 360 degrees Celsius.

The hot and dry oil from the flash drum is heated (110), either through heat exchange, by direct contact with a hotter stream and/or put into a vacuum column. It is then routed to the reactor. A gas stream (111), representing between 0.1% wt. and 15% wt. of the reactor feed stream, is introduced into the dry waste oil feed stream to the reactor. When used lubricating oils are processed, and the gas used is steam, the steam injection rate should be around 4% wt. on dry feed.

The sweep gas stream is any non-reactive, or a substantially non-reactive, gas that is introduced with the reactor feed stream, or via another injection nozzle, into the reactor via a separate nozzle. Examples of sweep gas streams include water steam, nitrogen and reaction non-condensable gas at normal conditions of atmospheric pressure and 15 degrees Celsius. By performing the process according to the present invention it has been surprisingly found that the sweep gas stream may additionally also serve a variety of functions such as, but limited to, the following functions:
  when injected into the reactor feed line, the sweep gas changes the density of the total feed stream; it changes the flow regimes within the feed line and/or nozzles, which results in lower incidence of fouling and plugging of the piping and spray nozzles, and in improved spray patterns; further, the sweep gas favours atomization of the oil stream before the oil reaches the reaction sites on the hot plates, and/or if introduced into the liquid feed at temperatures above that of the hydrocarbon liquid stream, it will increase the feed stream temperature and reduce the energy, or heat, provided by the kiln, and/or it reduces the oil's residence time in the reactor, by sweeping the hydrocarbon vapours out of the reactor soon after they are formed, thereby reducing the incidence of secondary reactions, or over-cracking, resulting in higher liquid yields and more stable liquid product oils, and/or the sweep gas present in the reactor reduces the liquid oil's partial pressure, and favours the vaporization of the lighter oil fractions, such as the gasoil and naphtha, in the feed and products; this also reduces over cracking in the gasoil fraction and increases the stability of the hydrocarbon liquid products, and/or the sweep gas helps to stabilize the pressure in the reactor, and/or the sweep gas helps to keep the velocity of the vapours exiting the reactor stable, improving the solids-vapour separation efficiency in downstream equipment;

when steam or nitrogen are used, the sweep gas reduces the risk of fires in the event of a leak in the reactor or in the downstream equipment; it will disperse the oil escaping and, hopefully, keep the oil from igniting, even if it is above its auto-ignition point, and/or it can also be part of the stripping gas stream in the product distillation unit.

The combined oil and gas stream is introduced into the reactor through one or more spray nozzles (114) within the rotating kiln (113) as described in the Canadian Patent Application No. 2,704,186.

The kiln rotates within a combustion chamber (115) which is fired by temperature controlled burners (116). The rotating kiln has internals and is kept at the desired temperature such that the vaporization and thermal cracking of the feed oil takes place before the liquid can reach the kiln wall.

The thermal process produces hydrocarbon vapours and small solid particles that contain most of the sulphur, all of the excess carbon, some of the halides and almost all of the metals that were in the feed oil.

The reactor operates at a positive pressure up to 100 KPa(g). The kiln operating temperature is determined by the quality and quantity of the reactor feedstock, and by the quality and quantity of the desired products, and by the reactor volume or residence time available. It can vary between 380 degrees Celsius and 4600 degrees Celsius for used lubricating oils feeds, and up to 550 degrees Celsius, when bitumen or heavy oils are treated.

The hydrocarbon vapours and the coke particles exit the reactor and enter a box and/or cyclone (117) separators where the solid particles are removed from the hydrocarbon vapours. In a preferred mode, the vapour-solids separators are in a heated chamber (118) or heat traced to prevent dew point condensation and plugging of the equipment. The coke (131) and other solids drop by centrifugal force and gravity, they are cooled (130) and sent to storage. Normally, the coke and other solids exiting the reactor are non-leachable.

The hydrocarbon vapours enter a flash drum (119) and self-refluxing condenser, or scrubbing tower (120) assembly, where the remaining coke is removed. The heavy oil from the bottom of the flash drum (129) can be mixed with the distillation column bottoms and/or recycled to the reactor feed and/or used as back flushing oil and/or sent to storage and sold. The vapours from the reactor are partially cooled (132) and enter the product separation unit (121). The vapours exiting the top of the main distillation column are cooled (122) and are separated in a three phase accumulator to yield the product gas (123), naphtha (124) and water (125).

The water is sent to storage or to the water treatment unit. After treatment, it can be re-used in the steam generation unit. Some of the naphtha is used as reflux to the main distillation column, the rest is sent to storage. It may be used as fuel in the plant. The gas is consumed on site as fuel in the plant.

The diesel fraction (127) is pulled as a side cut, possibly through a stripper, cooled (126) and sent to storage.

The column bottoms or heavy product (128) can either be recycled to the cracking vessel, or cooled and sold as de-metalized, low sulphur, heavy fuel oil. When heated the heavy oil is very effective as backwash oil in the plant. It permits on-stream cleaning of fouled equipment and minimises the need for chemical pre-treatment of used oil feeds.

PREFERRED EMBODIMENTS OF THE INVENTION

The invention is that of the a process using an indirectly fired rotating kiln (1), represented on FIGS. 1 and 2, having preferably the following dimensions 8' by 20' containing a charge of 1100 metal plates (2) that are lifted by one or more narrow shelves (3) as the reactor rotates at a speed comprised between 0.5 and 10 rpm. The shelves are wide enough to hold two plates: one against the wall, and a second one against the first plate. The plates are flat pieces of metal of regular shapes. The heat (5) coming through the reactor wall heats the plates as they are dragged and lifted against the reactor wall by one or more narrow shelves. As the rotation continues, the plates fall off the shelves or off the plates below them, and flip as they fall, presenting the hot surface to the oil jet (4) projected unto the plates (3) by a nozzle preferably spraying the oil in a rectangular pattern.

The plates carry the heat from the reactor walls and provide a hot surface where the reactions take place. The plates are lifted and kept against the reactor walls by shelves (3). Depending on the thickness of the plates, the shelves can be designed to hold one, two or more rows of plates. As the kiln rotates, the plates fall off the shelves or off the plates below, presenting the face that was against the reactor wall to the oil spray.

As they slide over each other, the metal plates become a surface that protects the reactor walls from direct contact with the relatively cold oil spray and from the resulting failure due to the thermal shock. Also, as they slide down the reactor, the plates scrape the reactor walls and each other clean of coke and avoid bridging of the depositing coke. The coke released is entrained out of the reactor with the hydrocarbon gas or is removed by the scoops, hopper and solids exit.

Figure 5:
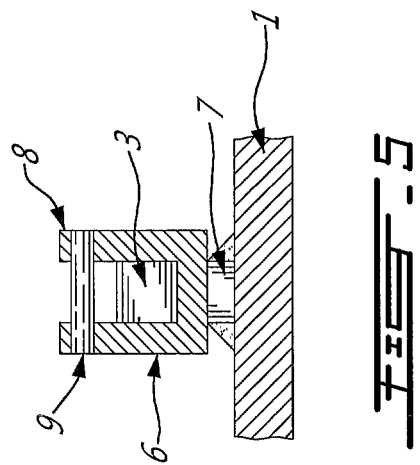
FIG. 5 represents the bracket of FIG. 4 shown from an end.
Figure 4:
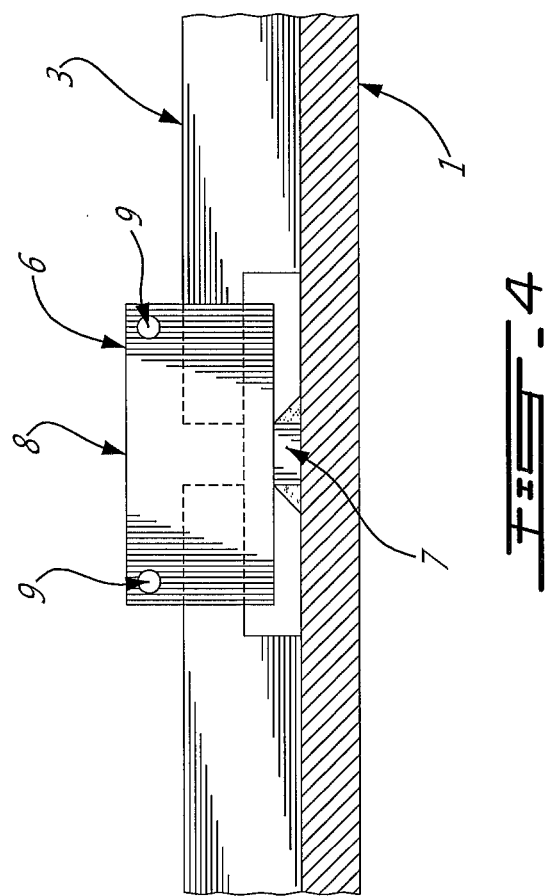
FIG. 4 represents a cross section of a bracket as present in the reactor represented in FIG. 2 with sections of shelves, seen from the top.
Figure 6:
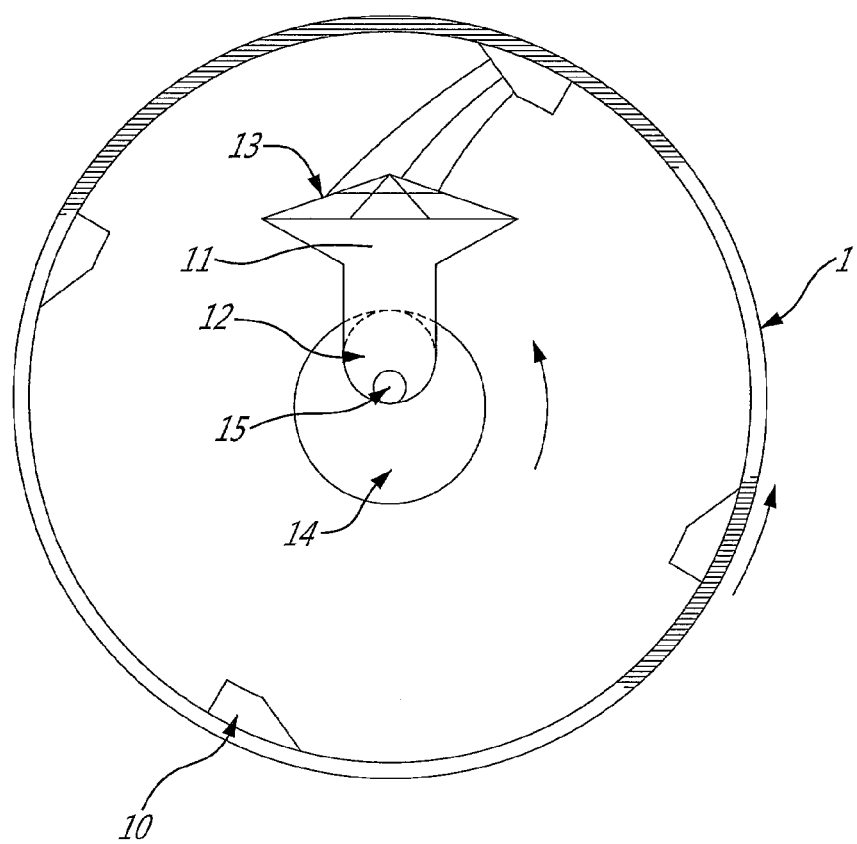
FIG. 6 illustrates an example of the exit end of the kiln represented in FIG. 1 with 4 scoops.

The shelves are attached to the reactor walls with clamps (6), represented on FIGS. 4 and 5, to reduce stress due to the differential thermal expansion between the reactor walls and the shelves. The clamps are spaced in such a way that, even at the hottest reactor temperature, the shelves are strong enough to support the hot plates on them. Depending on the spacing between the shelves, there may be only one double row of plates per shelf or several rows one on top of each other. Both the plates and shelves increase the heat transfer area from the heat source to the reaction site.

The clamps (6) are shaped like a T as represented in FIGS. 4 and 5. The base of the T (7) is welded to the rotating kiln walls. The cross bar or top of the T (8) is U shaped to receive the shelve (3) ends, leaving room for the thermal expansion of the shelves, both longitudinally and perpendicular to the reactor wall. Bolts (9) close off the U brackets and keep the shelves from falling out of the brackets. The branches of top of the T (6) are wide enough to allow for the thermal expansion of the shelves within them, while providing strength and support for the load of 1, 2 or more layers of the metal plates along the full length of the shelves in the reactor, and as many rows as the spacing between the shelves will accommodate.

Scoops (10) are attached to the kiln wall at the exit end of the kiln to remove heavier coke that may have deposited on the bottom of the kiln. The scoops are pipe sections with one end closed, and the other end cut on a slant, to allow any hydrocarbon vapours to escape before the coke falls into the hopper (11). The scoops are sized small enough so that the metal plates cannot enter with the coke. As the reactor rotates, the scoops turn upside down and dump their load of coke into a hopper mounted on the solids exit tube (12). To ensure that none of the plates block the coke exit from the reactor, the hopper has a metal grid (13) that will deflect any plate towards the bottom of the kiln. The solids exit tube (12) has a screw conveyor (15) to push the coke out of the reactor. The solids exit tube can be above the vapour exit tube (14), within the vapour exit tube, below the vapour exit, or even at separate ends. There must be at least two exits from the kiln to ensure that the reactor exit is never obstructed. In normal operation, the coke will exit the reactor mostly through the vapour exit (14). The scoops are required when the feed to the kiln is interrupted and there is no vapour to carry the coke out, or when there is a surplus of coke, or the coke is wet with oil or heavy.

The reactor is an indirectly fired rotating kiln, heated by the burner (5), and containing a charge of metal plates that carry the heat from the reactor walls and provide a hot surface where the reactions take place. The plates are lifted and kept against the reactor walls by one or more shelves, wide enough to hold two plates. As the kiln rotates, the plates fall off the shelves, presenting the face that was against the reactor wall to the oil spray. The metal plates protect the reactor walls from thermal shock, and scrape the walls and each other clean of coke. The shelves are attached to the reactor walls with clamps to reduce stress due to differential thermal expansion between the reactor walls and the shelves. Both the plates and shelves increase the heat transfer area from the heat source to the reaction site.

In the test apparatus, used lubricating oils or other oils from a collection depot are sprayed into a horizontal or slanted rotating kiln 10' in diameter and 8' long in order to thermally crack and vaporize the oil or the chemicals within it. The kiln has 4" fins welded in continuous spirals, 8" apart, to the inside of the kiln walls. A 1" wide shelf is attached to the fins, and a charge of 4" equilateral triangular metal plates is added.

As the kiln rotates, the shelf pushes and raises the blades along the reactor wall. As they reach just past the 5' height, they flip as they fall at the top of their run, presenting their hot side to the oil being sprayed on them.

Upon contact with the hot plates, the oil is thermally cracked and/or vaporized. The coke formed is either entrained with the vapours out of the kiln or it deposits on the plates. The plates, sliding against the reactor wall or on each other, scrape the coke free, and it is entrained out of the reactor with the vapours. Most of the coke exits the reactor with the hydrocarbon vapours, the residual coke is removed by the scoops, hopper and solids exit.

Four scoops are welded to the reactor wall at the exit end. They are made from 4" piping, 6" long, with one end plugged, and the other end cut on a slant. A hopper protected by a metal cage above it, receives the coke dumped by the scoops. The cage deflects any scooped up plate back into the reactor. The hopper receives the coke and drops it into the coke exit tube. A screw conveyor, on the bottom of the coke exit tube, carries the coke out of the reactor.

When the reactor feed is used lubricating oil, the recovered gas is 5% weight of the feed and has an average molecular weight of 42, the recovered liquid is 92% weight of the feed and has an average specific gravity of 0.83 and the solids are 3% weight of the feed and have a specific gravity of 1.7. These numbers depend on the feedstock composition, and on the reaction temperatures and pressures.

FIGS. 7, 9, 11 and 12 are illustrations of the apparatus adapted for different feedstocks.

FIG. 7 shows a vertical cross section of a reactor in the horizontal position. The reactor actually has four shelves, but only two are shown here (20). The other two shelves would be on the section not shown. The feed enters the reactor in pipe 21, and is projected unto the hot plates (23) by spray nozzles (22). A possible feed for this reactor would be an organic liquid such as waste oils.

Figure 7A:
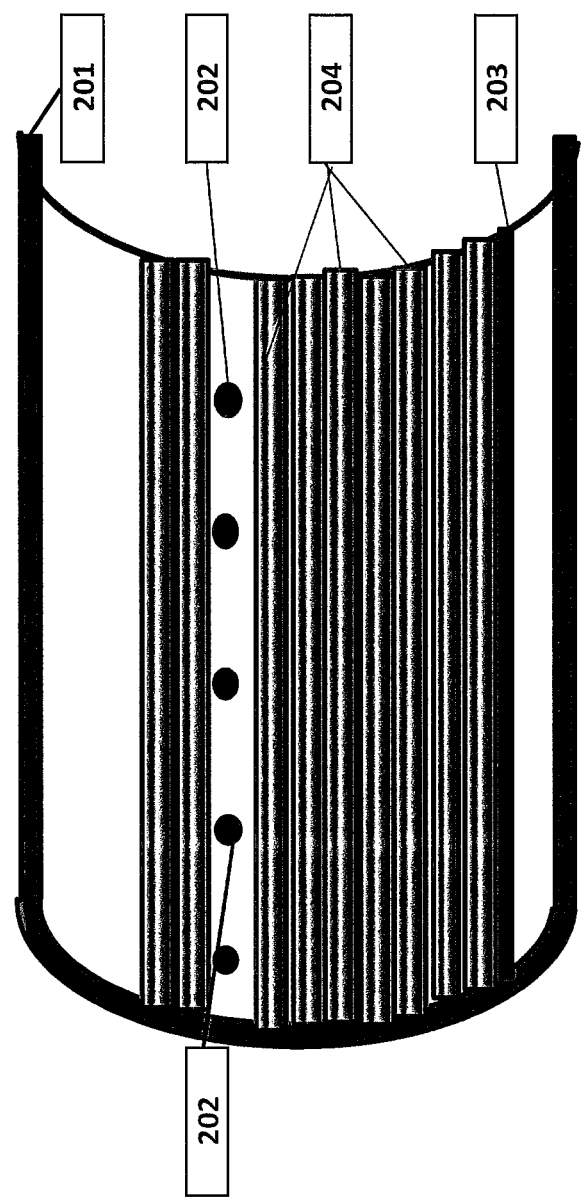
FIG. 7A is also a vertical cross section (201) of the same reactor as in FIG. 7 with the exception that two of the shelves (203) are replaced with a row of pegs, dowels or protuberances (202) that support and lift the plates (204). The rows of pegs serve the same functions as the shelves: they lift the plates, keeping them against the reactor wall.

FIG. 7A is also a vertical cross section (201) of the same reactor as in FIG. 7 with the exception that two of the shelves (203) are replaced with a row of pegs, dowels or protuberances (202) that support and lift the plates (204). The rows of pegs serve the same functions as the shelves: they lift the plates, keeping them against the reactor wall.

In a preferred embodiment of the invention, a sweep gas, such as steam or nitrogen, is injected into the reactor, either with the feed oil in the reactor feed pipe (21) and the spray nozzles (22), or through a secondary feed line (not shown).

The plates are lifted from the plate bed (24) by the shelves (20). In this illustration, the reactor (25) is supported by two horizontal cylinders (26) and is heated externally with gas or naphtha burners (27). The reactor rotates inside a heating chamber, which is stationary (38). There are various options for the heating chamber. It could be a section of a hot stack, where the stack gas needs to be cooled before clean-up, for example. A seal (37) is shown around the rotating kiln and the stationary wall of the heating chamber. It is useful to keep the feed pipe in place with support rings (28), as illustrated on FIG. 8. The gas and entrained coke leave the reactor through the gas exit pipe (29). Accumulated solid coke is scooped up by shovels (30), is dumped into a hopper (31), and is carried out of the reactor with the help of a screw conveyor (32) inside the solids exit pipe (33). There is a seal (34) between the rotating reactor and the product exit box (35). The product exit box is stationary. A first separation of solids and vapours occurs in the product exit box (35).

FIGS. 8A and 8B are two cases of center ring supports for the feed line (39), shown when the reactor is cool. FIG. 8C is the support rings in FIG. 8B when the reactor is hot. Figure A is for a smaller reactor radius with only one centre ring (40). FIG. 8B is for a larger reactor radius, for which two centre rings (40) and (41) are required to avoid deforming the support legs (42). In FIGS. 8B and C there are two sets of support legs: The first (42) hold the larger centre ring (41) in place. The second set of support legs hold the smaller centre ring (40) in place. The smaller centre ring supports the reactor feed pipe (39). The support legs (42) and (43) are attached to the reactor wall (45) and/or centre rings with brackets (44) that permit and/or allow the support beams to expand and rotate at their junction points with the reactor walls and rings.

FIG. 9 shows a vertical cross section of a reactor in the slanted position, about 5o from the horizontal in this illustration. This reactor would be used for feedstocks that contain solids such as sand. The reactor actually has four shelves, but only two are shown here (20). The other two shelves would be on the section not shown. The feed enters the reactor in pipe 21, it is pushed along the feed line with a screw conveyor and is projected unto the hot plates (23) by nozzles, holes and/or slits (22). The plates (23) are rectangular and are about as long as the reactor section where they are installed. The plates are lifted from the plate bed (24) by the shelves (20). In this illustration, the reactor (25) is supported by two slanted cylinders (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, through the screen (36), and are scooped up by the scoops (30). Accumulated solids are scooped up, along with residual coke, by shovels (30), are dumped into a hopper (31), and are carried out of the reactor with the help of a screw conveyor (32) inside the solids exit pipe (33). There is a seal (34) between the rotating reactor and the product exit box (35). The product exit box is stationary. A first separation of solids and vapours occurs in the product exit box (35).

Figure 10B:
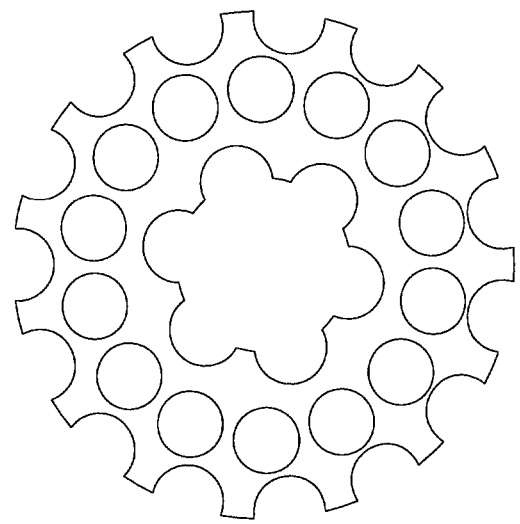
FIG. 10B is a front view of a screen made of a perforated disc.
Figure 10A:
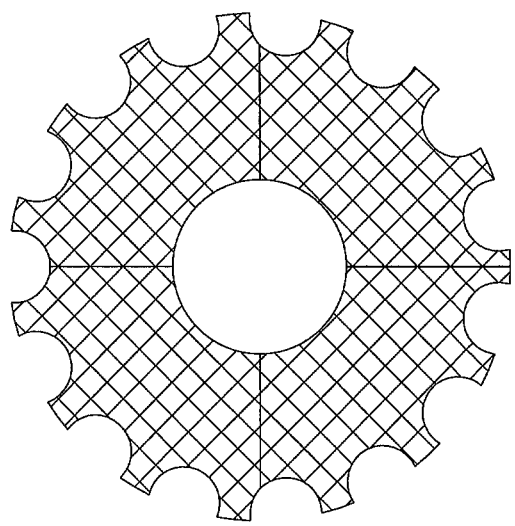
FIG. 10A is a front view of a screen made of wire mesh.

FIG. 10 shows two possible configurations for the screens (36) in FIGS. 7 and 9. FIG. 10A is a screen made of wire mesh. FIG. 10B is a screen made of a perforated disc. Both screens are tacked on to the reactor wall. Their outer circumferences are scalloped, allowing for different thermal expansions of the reactor walls and the screens with minimal stress on the reactor walls. Both configurations permit both the vapours and the solids to travel practically unimpeded from one end of the reactor to the other. The perforations are calculated so as to avoid movement of the plates from one section to the other. Also, the perforations must be too small for the ends of the plates to enter. The screens will be scraped clean by the plates, as the reactor turns.

Figure 11:
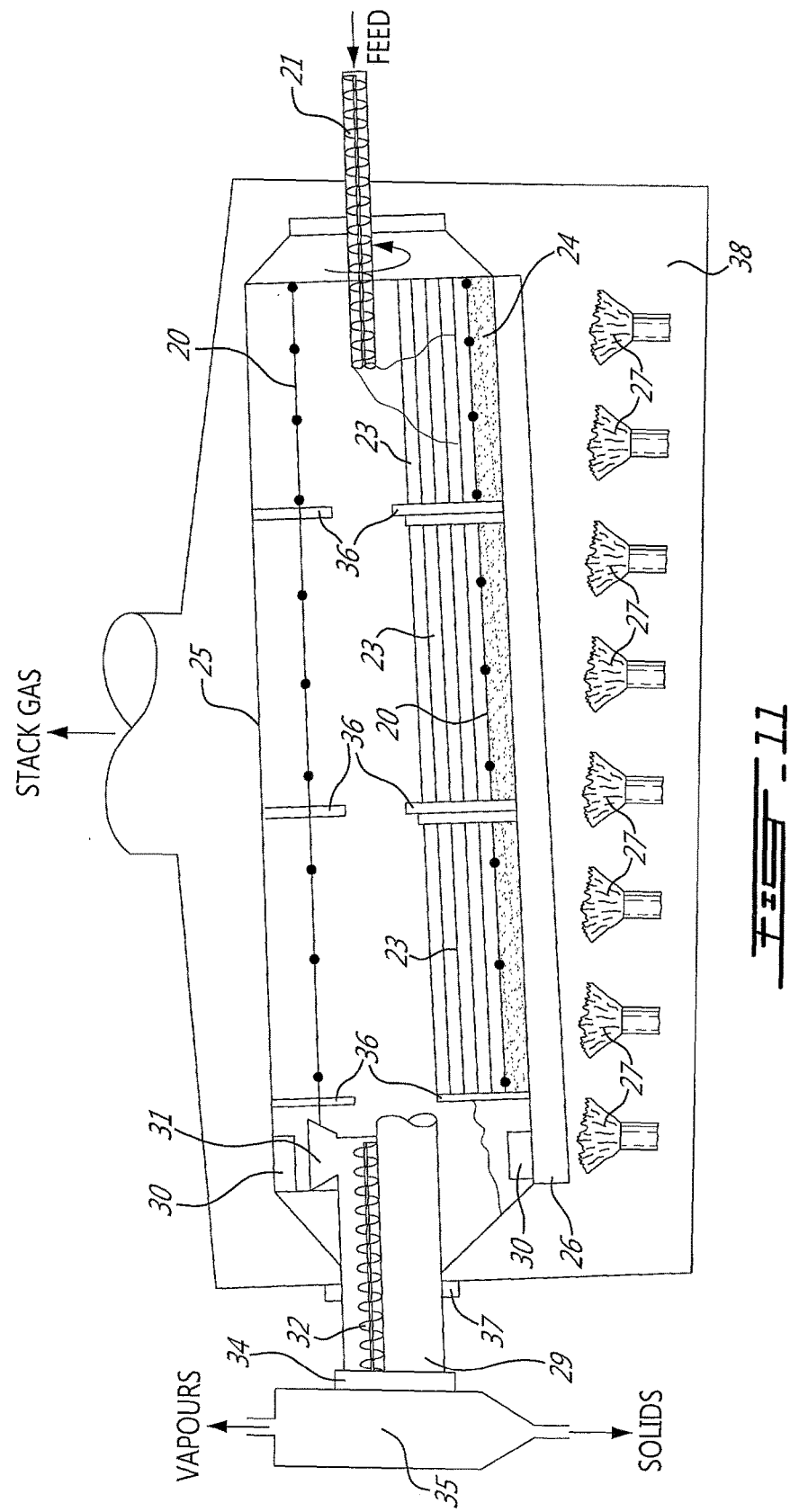
FIG. 11 is a vertical cross section of a reactor according to an embodiment of the invention in a slanted position wherein the feeding of the material to be treated and the exit of the thereby obtained vapours and solids are on opposite side of the reactor.
Figure 12:
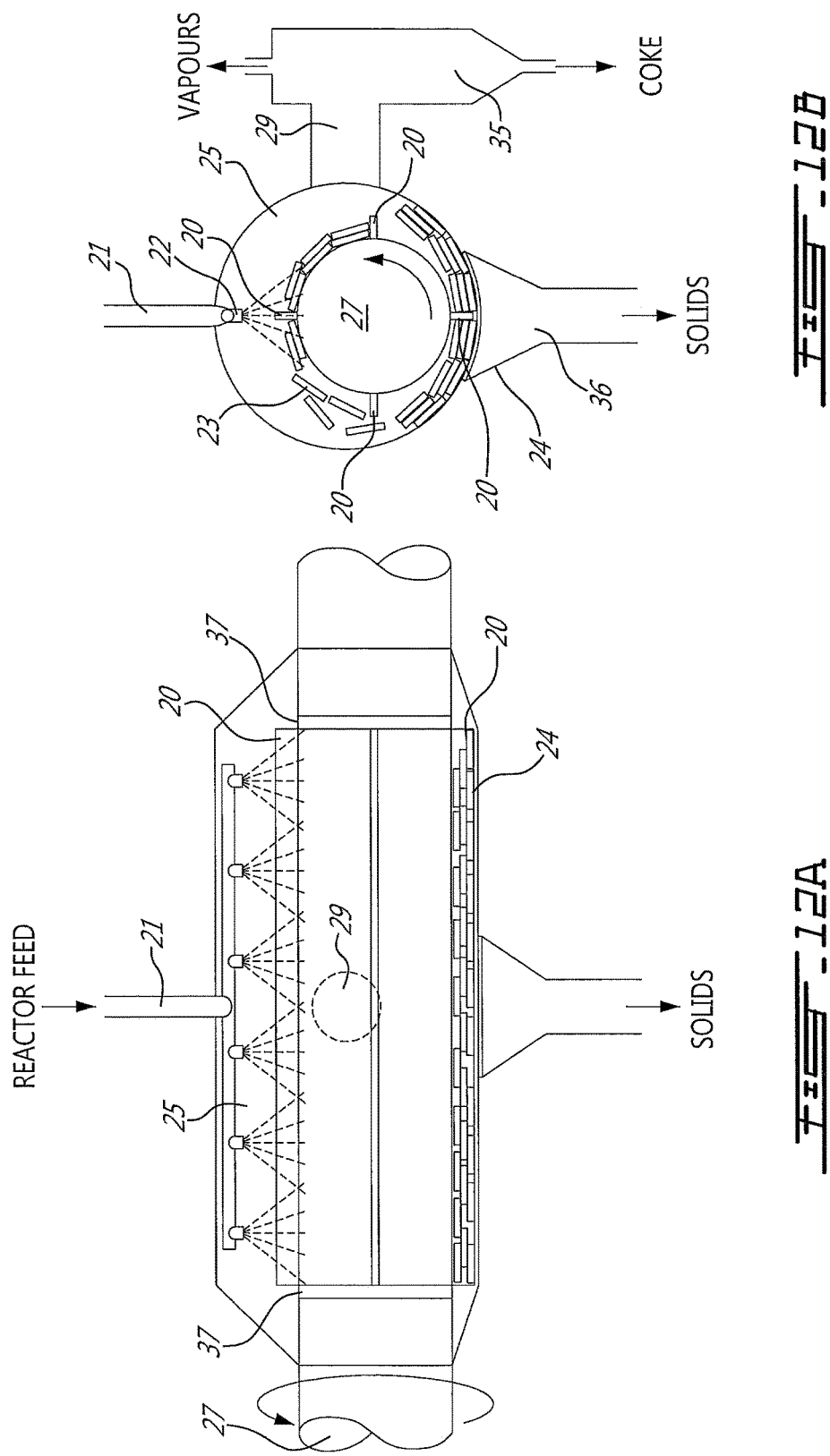
FIGS. 12A and 12B are a further alternate embodiment of the rotating reactor of the invention wherein heating is performed inside the reactor.

FIG. 11 is a vertical cross section of a reactor in the slanted position, about 5o from the horizontal is illustrated here.

This reactor would be used for feedstocks that contain solids such as sand.

The reactor actually has four shelves, but only two are shown here (20). The other two shelves would be on the section not shown. The feed enters the reactor in pipe 21, it is pushed along the feed line with a screw conveyor and is projected unto the hot plates (23) through the end of the pipe or slits in the pipe (22).

The plates (23) are rectangular and are about as long as the reactor section where they are installed when the reactor is heated. The plates are lifted from the plate bed (24) by the shelves (20). In this illustration, the reactor (25) is supported by two slanted cylinders (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, through the screens (36), and are scooped up by the scoops (30). Accumulated solids are scooped up, along with residual coke, by shovels (30), are dumped into a hopper (31), and are carried out of the reactor with the help of a screw conveyor (32) inside the solids exit pipe (33). There is a seal (34) between the rotating reactor and the product exit box (35).

The product exit box is stationary. A first separation of solids and vapours occurs in the product exit box (35).

Figure 13:
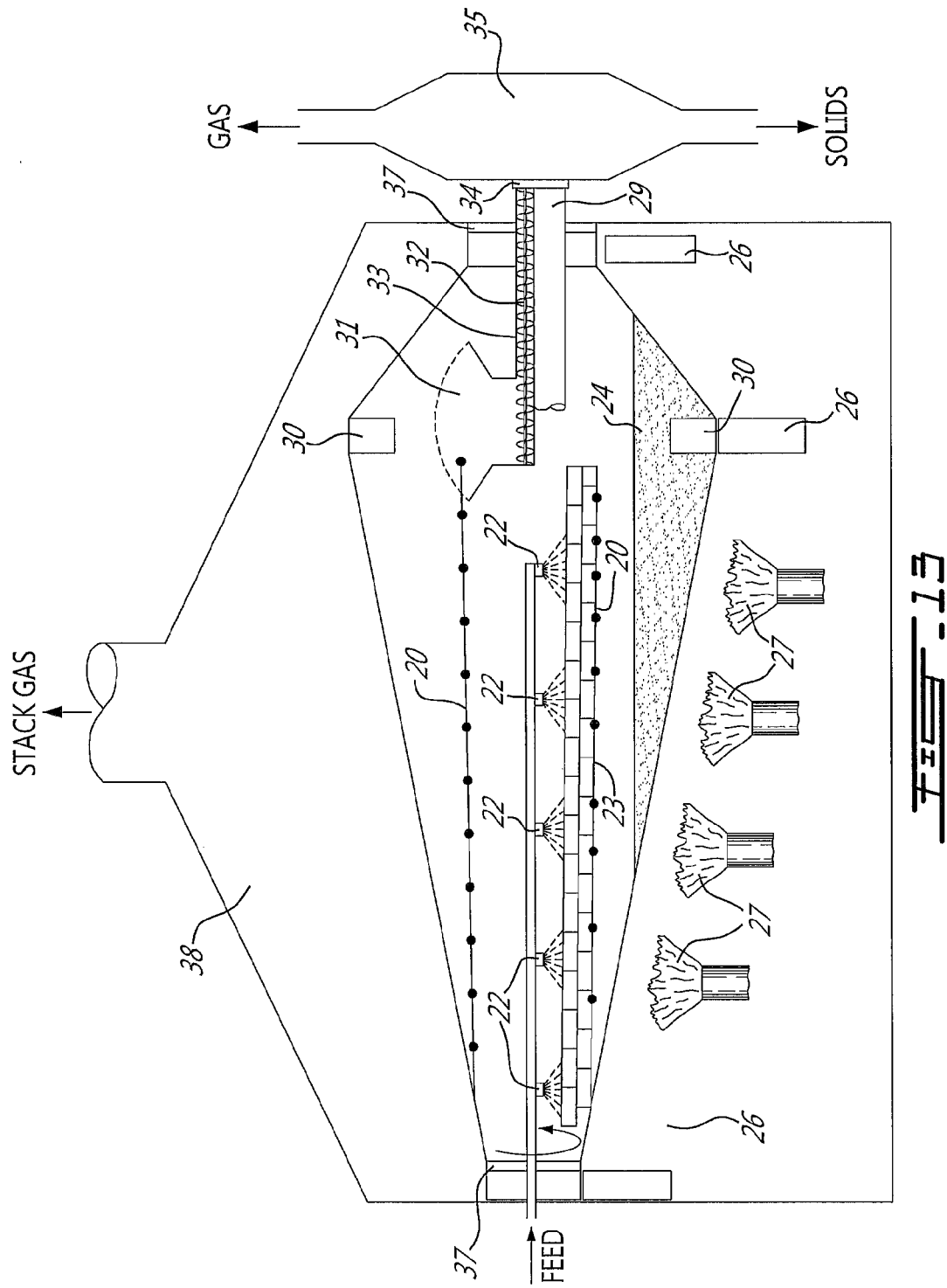
FIG. 13 is a vertical cross section of a reactor of the invention made up of two cones joined at the base.

FIG. 13 shows a vertical cross section of a reactor made up of two cones joined at the base.

This reactor could be used for liquid feedstocks and/or feedstocks that contain solids such as sand. The reactor actually has four shelves, but only two are shown here (20). The other two shelves would be on the section not shown. The feed enters the reactor in pipe 21, and is projected unto the hot plates (23) through the end of the pipe or spray nozzles (22).

The plates (23) are rectangular and are about as long as the reactor section where they are installed when the reactor is heated. The plates are lifted from the plate bed (24) by the shelves (20). In this illustration, the reactor (25) is supported by two truncated cones and a cylinder (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, and are scooped up by the scoops (30). Accumulated solids are scooped up, along with residual coke, by shovels (30), are dumped into a hopper (31), and are carried out of the reactor with the help of a screw conveyor (32) inside the solids exit pipe (33).

There is a seal (34) between the rotating reactor and the product exit box (35). The product exit box is stationary. A first separation of solids and vapours occurs in the product exit box (35). This shape of reactor allows the plates to slide back towards the entrance and scrape the walls, other plates and the shelves clean of coke and other deposited solids.

Figure 14:
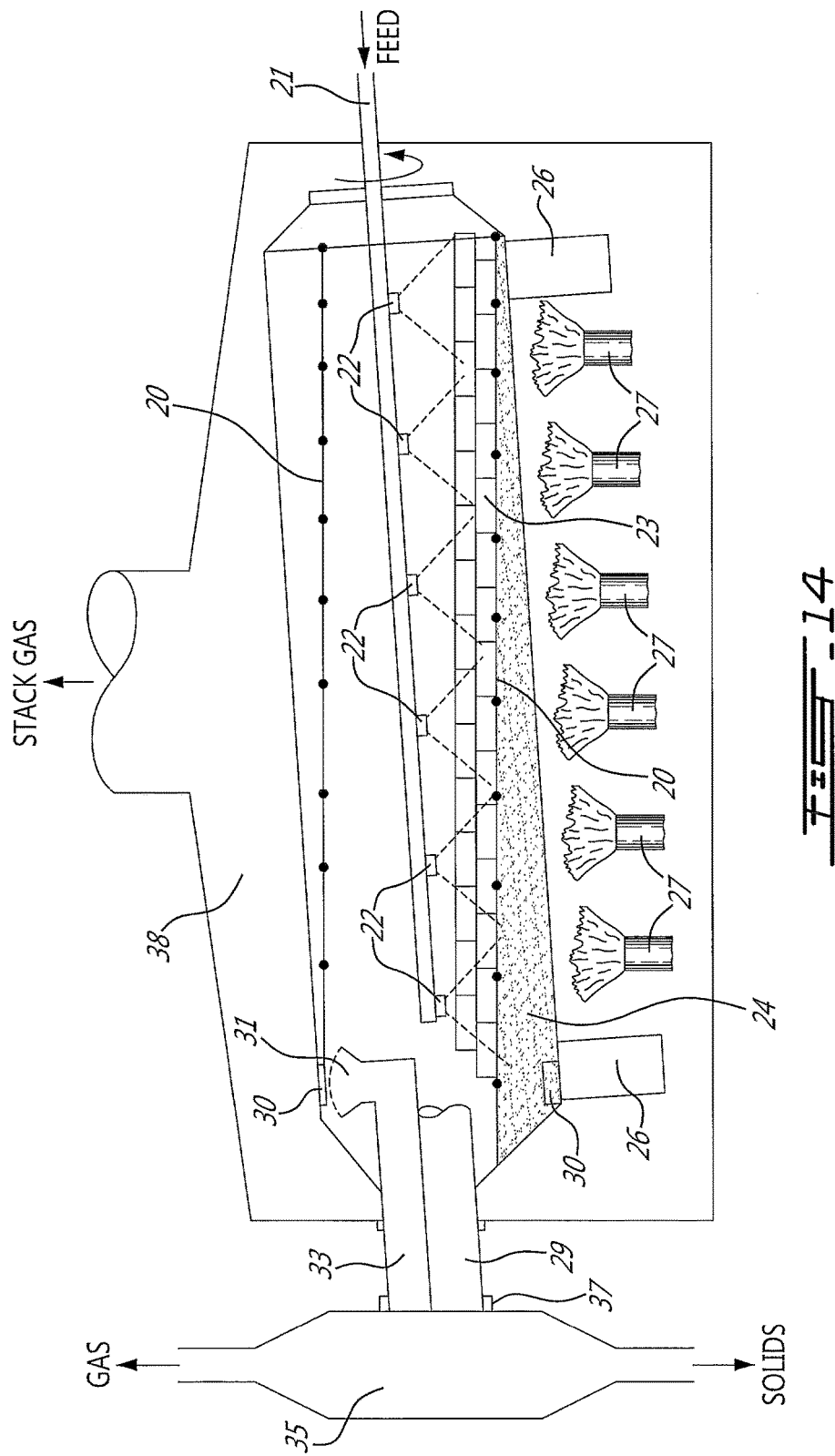
FIG. 14 is a vertical cross section of a reactor of the invention in a slanted position with a configuration particularly suited for treating heavy oils feedstocks that may produce more solids or more cokes or contain sand/or contaminated soils.

FIG. 14 represents a vertical cross section of a reactor in the slanted position, about 5° from the horizontal is illustrated here. This reactor would be used for heavy oils feedstocks that may produce more coke or contain sand or contaminated soils.

The reactor actually has four shelves, but only two are shown here (20). The other two shelves would be on the section not shown. The feed enters the reactor in pipe 21, it is either pumped or pushed along the feed line with a screw conveyor and is projected unto the hot plates (23) through spray nozzles or slits in the pipe (22). The plates (23) are rectangular and they not only flip when falling off the shelves, but also slide along the shelves, scraping coke off the shelves and reactor walls.

The plates are lifted from the plate bed (24) by the shelves (20). In this illustration, the reactor (25) is supported by two slanted rollers (26) and is heated externally with gas or naphtha burners (27).

The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, and are scooped up by the scoops (30). Accumulated solids are scooped up, along with residual coke, by shovels (30), are dumped into a hopper (31), and slide out of the reactor through the slanted solids exit pipe (33). There is a seal (34)

between the rotating reactor and the product exit box (35). The product exit box is stationary. A first separation of solids and vapours occurs in the product exit box (35).

Advantages of the Use of the Sweep Gas in the Rotating Kiln

In order to understand the advantages of the invention, it may be useful to explain why the invention was necessary and how it progressed.

In the kiln above, at first, the oil was sprayed on a charge of ceramic balls. For the reaction to occur, the kiln had to be over heated because the charge impeded heat transfer to the reaction sites. Furthermore, the ceramic balls were too smooth and light to scrape the coke off the reactor walls. The balls exploded into dust because of the thermal shock between the cold oil and the hot reactor wall. The reactor had to be shut down to remove the coke and ceramic dust that caked the reactor wall and bottom. The reactor runs were less than a day long.

The solids charge was changed to a number of coarse granulated solids charges. They were more effective in scraping the coke off the reactor walls but soon the coke stayed trapped within the charge, again impeding the heat transfer to the reactor sites. The temperature at the reaction site varied as the coke built up within the charge. The run times increased to 3 to 4 days before the reactor had to be shut-down.

The solids charge was replaced by off-spec cultivator blades: equilateral triangles, with 6" sides, made of carbon steel. The blades were effective in keeping the reactor walls clean but the temperature in the reactor continued to vary. A shelf was attached to the reactor wall and the reaction temperature became steady and easier to control, allowing for a specific slate of products of consistent qualities. The reactor walls stayed free of coke and run times increased to 6 weeks or more.

Thermal cracking is an endothermic reaction. Since the oil spray was directed to the hot metals plates, the coke deposited on the metal plates instead of the reactor walls. The blades not only removed the coke that formed on the reactor wall, they protected the reactor wall from coke depositing there in the first place. The shelf pushed the metal plates higher and longer against the reactor wall. The reaction surface area and its temperature could be increased without over firing the kiln.

There was a conveyor to transport the coke from the bottom of the reactor to the exit tube. The conveyor was enclosed, protecting the coke and hydrocarbon vapours from the heat source. This caused the coke to be wetted by the condensing oil, and to agglomerate. This apparatus resulted in the formation of coke-oil plugs that obstructed the exit tube and caused over pressuring of the reactor, failure of the seals, escape of hot oil above its auto-ignition temperature and fires. The enclosed conveyor was replaced with scoops, open to the kiln heat, dumping dry coke into the new coke exit tube. The coke exit tube was separated from the vapour exit to avoid re-entrainment of the fines into the product vapours or plugging of the only exit from the reactor and over-pressurizing the reactor.

Because of variations in feedstock quality and quantity, reactor operation was difficult, exhibiting wide pressure and temperature swings. Steam injection at rates up to 10% wt. on dry reactor feed was implemented, resulting in a more stable operation and higher yields and qualities of the gasoil produced, as illustrated in the following examples.

EXAMPLES

The following examples are given as a matter of illustration and should not be constructed as constituting any limitation of the scope of the present invention in its generality.

Examples 1, 2 and 3 were tests performed using dry waste oil drawn from the same drums to eliminate test result differences due to variations in feed oil quality as much as possible.

Example 1 was performed with the injection of 5% wt. water added to the 16 l/h reactor feed oil.

Example 2 kept the same oil feed rate and operating conditions as in example 1 but without water injection into the reactor feed.

In example 3, the oil feed rate was increased by 50% to 24 l/h, again without water in the reactor feed.

Example 4 was performed on the same kiln but with a different oil sample. Example 5 was performed on a larger kiln with oil similar to that used in example 4.

Example 1: With the Injection of 5% Wt. Water Added to the 16 l/h Reactor Feed Oil Refer to Table 1—Example 1 for a summary of the operating conditions and feed and products rates and analyses. The waste oil streams tested contained used lubricating oils as well as other oily streams such as metal working oils, transmission fluids, greases, form oils, and any number of unknown waste oil streams.

TABLE 1

EXAMPLE 1
Reactor Size: L = 1.07 m, Diameter 0.47 m
Reactor Temperature: 490 C.
Reactor Pressure: 124 KPa(a)
Sweep Gas: Steam @ 5% Weight on Feed
Heavy Oil Recycle: None
Oil Feed Rate: 16 L/h

| Test | Method | Units | Feed Oil | Gas | Naphtha | Gasoil | Heavy Oil | Coke & Solids |
|---|---|---|---|---|---|---|---|---|
| Weight % on Dry Oil Feed | | | 100 | 5.3 | 8.0 | 56.5 | 20.6 | 9.6 |
| Density @ 15 C. | ASTM D4052 | g/ml | 0.89 | | 0.758 | 0.866 | 0.933 | 1.4 |
| Molecular Weight | | g/mole | | 36.7 | | | | |
| Water (1) | STM D1533 | Volume % | 5.7 | 0.7 | | | | |
| Metals | Digestion & ICP-IS | ppm Weight | 2160 | | | 3 | 240 | 25550 |
| Sulphur | LECO S32 | Weight % | 0.63 | 0.0037 | 0.05 | 0.26 | 0.91 | 2.63 |
| Halogens | Oxygen Bomb Combustion | ppm Weight | 470 | | 192 | 84.3 | 5 | 219 |
| Viscosity @ 40 C. | ASTM D445 | cSt | 33.6 | | | 2.11 | 77.1 | |

TABLE 1-continued

EXAMPLE 1
Reactor Size: L = 1.07 m, Diameter 0.47 m
Reactor Temperature: 490 C.
Reactor Pressure: 124 KPa(a)
Sweep Gas: Steam @ 5% Weight on Feed
Heavy Oil Recycle: None
Oil Feed Rate: 16 L/h

| Test | Method | Units | Feed Oil | Gas | Naphtha | Gasoil | Heavy Oil | Coke & Solids |
|---|---|---|---|---|---|---|---|---|
| Copper Strip Corrosion | ASTM D120 | | | | | 1a | | |
| Sediments | ASTM D2276 | mg/ml | | | | 0.5 | 0.05 | |
| Flash Point | ASTM D92 | C. | 128 | | | 48 | <100 | |
| CCR | D189 | Weight % | 3.34 | | | 1.01 | | |
| Ash | ASTM D4422 & ASTM D482 | Weight % | 0.4 | | | 0.01 | 0.05 | 7.43 |
| pH | | | | | | | | |
| Distillation | ASTM D2887 | Weight % | | | | | | |
| IBP | | C. | 162 | | 30 | 110 | 338 | |
| 10% | | C. | 246 | | 47 | 156 | 374 | |
| 50% | | C. | 414 | | 98 | 255 | 436 | |
| 90% | | C. | 528 | | 133 | 355 | 525 | |
| EP | | C. | 592 | | 157 | 419 | 589 | |

Notes:
(1) The oil feed is 95% of the reactor feed stream, while the water entering the kiln makes up the other
The steam injected into the reactor feed stream is condensed in the distillation column overhead cond
All the product yields are calculated on a dry oil basis.

Notes (1): The oil feed is 95% of the reactor feed stream, while the water entering the kiln makes up the other 5%. The steam injected into the reactor feed stream is condensed in the distillation column overhead. All the product yields are calculated on a dry oil basis.

A dewatered waste oil stream of 16 L/min is injected in an indirectly fired rotating kiln, containing metal shavings at 490 degrees Celsius reactor exit temperature.

The seals on the kiln were changed to permit pressures above atmospheric in the reaction zone. Water was also injected into the reactor feed stream at the rate of 5% weight on dry oil feed.

As shown on Table 6, a 72% conversion of the 350 degrees Celsius+fraction into lighter oils, gas and coke was observed. Over 95% of the metals entering the reactor exits with the coke.

Example 2: Kept the Same Oil Feed Rate and Similar Operating Conditions as in Example 1 but without Water Injection into the Reactor Feed Please refer to the Table 2

TABLE 2

Example 2
Reactor Size: L = 1.07 m, Diameter 0.47 m
Reactor Temperature: 500 C.
Reactor Pressure: 125 KPa(a)
Sweep Gas: None
Heavy Oil Recycle: None
Oil Feed Rate: 16 L/h

| Test | Method | Units | Feed Oil | Gas | Naphtha | Gasoil | Heavy Oil | Coke & Solids |
|---|---|---|---|---|---|---|---|---|
| Weight % on Dry Oil Feed | | | 100 | 9.8 | 11.2 | 46.8 | 22.6 | 9.6 |
| Density @ 15 C. | ASTM D4052 | g/ml | 0.893 | | 0.758 | 0.865 | 0.933 | 1.4 |
| Molecular Weight | | g/mole | | 37.4 | | | | |
| Water | STM D1533 | Volume % | 0.7 | | | | | |
| Metals | Digestion & ICP-IS | ppm Weight | 2160 | | | 3 | Not Done | 25510 |
| Sulphur | LECO S32 | Weight % | 0.63 | Not Done | 0.05 | 0.26 | 0.91 | 2.63 |
| Halogens | Oxygen Bomb Combustion | ppm Weight | 470 | | 192 | 85 | 5 | 219 |
| Viscosity @ 40 C. | ASTM D445 | cSt | 33.6 | | | 2.1 | 77.1 | |
| Copper Strip Corrosion | ASTM D120 | | | | | 1a | | |
| Sediments | ASTM D2276 | mg/ml | | | | 0.5 | 0.05 | |
| Flash Point | ASTM D92 | C. | 128 | | <0 | 48 | | |
| CCR | ASTM D189 | Weight % | 3.34 | | | 1.01 | | |
| Ash | ASTM D4422 & ASTM D482 | Weight % | 0.4 | | | 0.01 | 0.05 | 7.43 |
| pH | | | | | | | | |
| Distillation | ASTM D2887 | Weight % | | | | | | |
| IBP | | C. | 162 | | 30 | 150 | 338 | |
| 10% | | C. | 246 | | 47 | 178 | 374 | |

TABLE 2-continued

Example 2
Reactor Size: L = 1.07 m, Diameter 0.47 m
Reactor Temperature: 500 C.
Reactor Pressure: 125 KPa(a)
Sweep Gas: None
Heavy Oil Recycle: None
Oil Feed Rate: 16 L/h

| Test | Method | Units | Feed Oil | Gas | Naphtha | Gasoil | Heavy Oil | Coke & Solids |
|---|---|---|---|---|---|---|---|---|
| 50% | | C. | 414 | | 98 | 255 | 436 | |
| 90% | | C. | 528 | | 133 | 343 | 525 | |
| EP | | C. | 592 | | 157 | | 589 | |

Example 2 for a summary of the operating conditions and feed and products rates and analyses. The waste oil streams tested contained used lubricating oils as well as other oily streams such as metal working oils, transmission fluids, greases, form oils, and any number of unknown waste oil streams.

A dewatered waste oil stream of 16 L/h is injected in an indirectly fired rotating kiln, containing metal shavings at 490 to 500 degrees Celsius. This stream was drawn from the same barrel as in Example 1. The seals on the kiln had been changed to permit pressures above atmospheric in the reaction zone. There was no steam or water injection into the reactor for this test.

As shown on Table 6, a 69% conversion of the 350 degrees Celsius+fraction into lighter oils, gas and coke was observed. Over 95% of the metals entering the reactor exits with the coke.

The main difference between these two examples is in the gasoil make: in example 1, the gasoil in the products was 56.5% wt., a gain of 30.5% wt. on feed oil. In example 2, the gasoil make was 46.8% weight of the products, a gain of only 20.8% weight on feed oil. The injection of steam into the reactor may have impeded the secondary reactions in which the gasoil present in the reactor is cracked, producing naphtha and gas. The operation of the reactor during example 1 was more stable than for example 2 in that temperatures and pressure swings were calmed. The wide range diesel oil produced was lighter in colour and more stable in example 1 than example 2.

Example 3: The Oil Feed Rate was Increased by 50% to 24 l/h, Again without Water in the Reactor Feed Please refer to the Table 3—Example 3 for a summary of the operating conditions and feed and products rates and analyses.

TABLE 3

Example 3
Reactor Size: L = 1.07 m, Diameter 0.47 m
Reactor Temperature: 495 C.
Reactor Pressure: 125 KPa(a)
Sweep Gas: None
Heavy Oil Recycle: None
Oil Feed Rate: 24 L/h

| Test | Method | Units | Feed Oil | Gas | Naphtha | Gasoil | Heavy Oil | Coke & Solids |
|---|---|---|---|---|---|---|---|---|
| Weight % on Dry Oil Feed | | | 100 | 0.6 | 11.9 | 54 | 29 | 4.5 |
| Density @ 15 C. | ASTM D4052 | g/ml | 0.889 | | 0.752 | 0.862 | 0.931 | 9.0 |
| Molecular Weight | | g/mole | | 37.6 | | | | |
| Water | STM D1533 | Volume % | 0.7 | | | | | |
| Metals | Digestion & ICP-IS | ppm Weight | 86.9 | | | 0.04 | 61 | (1) |
| Sulphur | LECO S32 | Weight % | 0.63 | | 0.03 | 0.26 | 0.88 | 2.63 |
| Halogens | Oxygen Bomb Combustion | ppm Weight | 470 | | 190 | 84.5 | 45.2 | 219 |
| Viscosity @ 40 C. | ASTM D445 | cSt | 33.6 | | | 1.89 | 66.3 | |
| Copper Strip Corrosion | ASTM D120 | | | | | | 3b | |
| Sediments | ASTM D2276 | mg/ml | 0.14 | | | 0.6 | 0.05 | |
| Flash Point | ASTM D92 | C. | 128 | | <0 | 41 | 222 (OC) | |
| CCR | D189 | Weight % | 3.34 | | | 0.87 | | |
| Ash | ASTM D4422 & ASTM D482 | Weight % | 0.4 | | | | 0.05 | 7.43 |
| pH | | | 4.32 | | | | | |
| Distillation | ASTM D2887 | Weight % | | | | | | |
| IBP | | C. | 162 | | 30 | 144 | 338 | |
| 10% | | C. | 246 | | 45 | 172 | 368 | |
| 50% | | C. | 414 | | 94 | 251 | 431 | |
| 90% | | C. | 528 | | 126 | 335 | 518 | |
| EP | | C. | 592 | | 146 | 400 | 588 | |

Note:
(1) Metals in the coke was not done. The ash at 7.43% wt. is mostly composed of the metals in the coke The waste oil streams tested contained used lubricating oils as well as other oily streams such as metal working oils, transmission fluids, greases, form oils, and any number of unknown waste oil streams. The oil in this test was taken from the same drums as for examples 1 and 2. However, the analytical data differs a little from the previous examples. This confirms that waste oil feedstocks can change in properties, even when pulled from a single tank.

because of pressure swings and decreasing temperatures in the steal chip bed.

Example 4: Performed on the Same Kiln but with a Different Oil Sample

Please refer to the Table 4—Example 4 for a summary of the operating conditions and feed and products rates and analyses.

TABLE 4

Example 4
Reactor Size: L = 1.07 m, Diameter 0.47 m
Reactor Temperature: 500 C.
Reactor Pressure: 125 KPa(a)
Sweep Gas: Steam @ 0.5% wt on dry oil feed
Heavy Oil Recycle: None
Oil Feed Rate: 6.7 L/hr

| Test | Method | Units | Feed Oil | Gas | Naphtha | Gasoil | Heavy Oil | Coke & Solids |
|---|---|---|---|---|---|---|---|---|
| Weight % on Dry Oil Feed | | | 100 | 3 | 9 | 70 | 17 | 1 |
| Density @ 15 C. | ASTM D4052 | g/ml | 0.88 | | 0.841 | 0.889 | 1.109 | 2.683 |
| Molecular Weight | | g/mole | | 37 | | | | |
| Water | STM D1533 | Volume % | 0.53 | | | | | |
| Metals (1) | Digestion & ICP-IS | ppm Weight | 92.3 | | 0 | 0 | 81.6 | 78540 |
| Sulphur | LECO S32 | Weight % | 0.33 | | 0.063 | 0.15 | 0.5 | 1.97 |
| Halogens | Oxygen Bomb Combustion | ppm Weight | 367 | | 78 | 75 | 199 | |
| Viscosity @ 40 C. | ASTM D445 | cSt | 45.3 | | | 1.276 | | |
| Copper Strip Corrosion | ASTM D120 | | | | | | | |
| Sediments | ASTM D2276 | mg/ml | 0.25 | | | | | |
| Flash Point | ASTM D92 | C. | 91 | | <7 | 32.5 | 220 | |
| MCRT | ASTM D4530 | Weight % | 1.25 | | | 0.13 | | |
| Ash | ASTM D4422 & ASTM D482 | Weight % | 0.61 | | | 0 | 0.02 | 68.64 |
| pH | | | | | | | | |
| Distillation | ASTM D2887 | Weight % | | | | | | |
| IBP | | C. | 151 | | 25 | 78 | 314 | |
| 10% | | C. | 326.6 | | 78 | 138 | 355 | |
| 50% | | C. | 429 | | 80 | 209 | 442 | |
| 90% | | C. | 558 | | 135 | 315 | 612 | |
| EP | | C. | 750 | | | 397 | | |

Notes:
(1) Metals in this table include only Cadnium, Chrome, Copper, Iron, Nickel, Lead, and Vanadium A dewatered waste oil stream of 24 L/h is injected in an indirectly fired rotating kiln, containing metal shavings at 490 to 500 degrees Celsius. The seals on the kiln were changed to permit pressures above atmospheric in the reaction zone. There was no steam or water injection during this test.

As shown on Table 6, a 61% conversion of the 350 degrees Celsius+fraction into lighter oils, gas and coke was observed. Over 95% of the metals entering the reactor exits with the coke.

In this example, the feed rate was increased by 50% over the first two examples, and there was no steam or water injection. Although the conversion of heavy oil is lower than in the first two examples, 61% of the 350 degrees Celsius+ oil was cracked, the gasoil gain was 28% weight, higher than for example 2, and slightly lower than in example 1. See Table 6. Increasing the feed rate by 50% also reduced the secondary reactions but operation of the reactor was difficult The waste oil streams tested contained used lubricating oils as well as other oily streams such as metal working oils, transmission fluids, greases, form oils, and any number of unknown waste oil streams. This oil was heavier than the feed oil in the previous three examples.

A dewatered waste oil stream of 6.7 L/h is injected in an indirectly fired rotating kiln, containing metal shavings at 490 degrees Celsius. The seals on the kiln were changed to permit pressures above atmospheric in the reaction zone. Steam was also injected into the reactor at the rate of 0.5% weight on feed.

As shown on Table 6, a 79.5% conversion of the 350 degrees Celsius+fraction into lighter oils, gas and coke was achieved. The gasoil make was 70% wt., an increase of 57% of the feed oil. Over 95% of the metals entering the reactor exited with the coke.

Example 5: Performed on a Larger Kiln with Oil Similar to that Used in Example 4

Please refer to the Table 5—Example 5 for a summary of the operating conditions and feed and products rates and analyses.

TABLE 5

Example 5
Reactor Size: L = 2.44 m; Diameter = 3.05 m
Reactor Temperature: 500 C.
Reactor Pressure: 50 KPa(a) average
Sweep Gas: 0
Heavy Oil Recycle: 350 L/h
Oil Feed Rate: 1125 L/h

| Test | Method | Units | Feed Oil | Gas | Naphtha | Gasoil | Heavy Oil | Coke & Solids |
|---|---|---|---|---|---|---|---|---|
| Weight % on Dry Oil Feed | | | 100 | 2.6 | 7.6 | 51.7 | 35.2 | 2.9 |
| Density @ 15 C. | ASTM D4052 | g/ml | 0.897 | | 0.751 | 0.846 | 0.876 | 1.8 |
| Molecular Weight | | g/mole | | | | | | |
| Water | STM D1533 | Volume % | 14.7 | | | | | |
| Metals (1) | Digestion & ICP-IS | ppm Weight | 3650 | | 2.4 | 1.4 | 10.3 | |
| Sulphur | ASTM D808 | Weight % | 0.36 | | | 0.07 | 0.09 | |
| Halogens | Oxygen Bomb Combustion | ppm Weight | 350 | | | 0.02 | <3 | |
| Viscosity @ 40 C. | ASTM D445 | cSt | | | | 2.21 | | |
| Copper Strip Corrosion | ASTM D120 | | | | | 1a | | |
| Sediments | ASTM D2276 | mg/ml | 0.6 | | 0 | <0.01 | 0.009 | |
| Flash Point | ASTM D93 | C. | 42 | | | 51 | 214 | |
| MCRT | ASTM D4530 | Weight % | | | | | | |
| Ash | ASTM D4422 & ASTM D482 | Weight % | | | | | | 37.1 |
| pH | | | | | | | | |
| Distillation | ASTM D2887 | Weight % | | | | | | |
| IBP | | C. | 91 | | 39 | 134 | 318 | |
| 10% | | C. | 295 | | 77 | 173 | 429 | |
| 50% | | C. | 421 | | 114 | 269 | 481 | |
| 90% | | C. | 499 | | 19 | 370 | 539 | |
| EP | | C. | 571 | | 182 | 422 | 689 | |

The waste oil streams tested contained used lubricating oils as well as other oily streams such as metal working oils, transmission fluids, greases, form oils, and any number of unknown waste oil streams. This oil was heavier than the feed oil in the first three examples, but comparable to the oil in example 4. This test was carried out on a larger kiln than for the previous examples.

A dewatered waste oil stream of 1125 L/h is injected in an indirectly fired rotating kiln, containing metal shavings at 500 degrees Celsius. The seals on the kiln did not permit pressures above atmospheric in the reaction zone. There was no steam injected into the reactor during this test. The total heavy oil stream of 350 L/h was recycled and added to the reactor feed stream. The pressure in the reactor varied between 30 KPa(a) and 90 KPa(a) and it was difficult to keep the temperature stable.

As shown on Table 6, a 58.8% conversion of the 350 degrees Celsius+fraction into lighter oils, gas and coke was achieved. The gasoil make was 51.7% wt., an increase of 39.7% wt. of the feed oil. Over 99% of the metals entering the reactor exited with the coke. The best separation of the coke from the vapours exiting the reactor was achieved during this test. Over 75% of the sulphur entering the reactor exited the process with the coke.

TABLE 6

Heavy Oil Conversion and Gasoil Gain

| | Example | | | | | |
|---|---|---|---|---|---|---|
| | 1 | 2 | 3 | 4 | 5 | Other (1) |
| Heavy Oil - 350 C.+ | | | | | | |
| % wt in Feed oil | 74 | 74 | 73 | 83 | 85 | 84 |
| % wt in Products | 20.6 | 22.6 | 29 | 17 | 35 | 9 |
| % Conversion | 72.2 | 69.5 | 61 | 79.5 | 58.8 | 86.9 (2) |

TABLE 6-continued

Heavy Oil Conversion and Gasoil Gain

| | Example | | | | | |
|---|---|---|---|---|---|---|
| | 1 | 2 | 3 | 4 | 5 | Other (1) |
| Gasoil - 185 C. to 350 C. | | | | | | |
| % wt in Feed oil | 26 | 26 | 26 | 13 | 12 | 12.5 |
| % wt in Products | 56.5 | 46.8 | 54 | 70 | 51.7 | 63.2 |
| % wt Gain on Feed oil | 30.5 | 20.8 | 28 | 57 | 39.7 | 50.7 |

Notes:
(1) "Other" is the average obtained by operating the larger kiln over 5,000 hours with between 0 and 10% wt. (on dry oil feed) steam injection.
(2) During these runs, about 30% of the heavy oil make was recycled back to the reactor feed.

The average results from some 5,000 hours of subsequent runs on this kiln are shown in the "other" column of Table 6. They achieved an average 86.9% conversion of the heavy oil fraction entering the reactor in the dry waste oil feed. The wide range diesel oil fraction in the feed oil of 12.5% wt. became 63.2% wt. at the reactor exit, an increase of 50.7% wt. on dry oil feed.

Some embodiments of the invention may have only one of these advantages; some embodiments may several advantages and/or may have all of them simultaneously.

Advantages of the Process of the Invention

This is a simple process that can treat a wide variety of waste oils and make useful and environmentally friendly products.

This process is in energy equilibrium. When used lubricating oils are processed, the produced gas and naphtha are consumed on site, and there is little or no need to purchase fuel, or to use the more valuable wide range diesel or heavy oil products from the plant. There is also no naphtha to dispose of.

When produced, the wide range diesel is a light amber colour. The produced diesel is unstable and will darken with time or when exposed to air. The diesel deteriorates much faster, within days instead of months, if there is no inert gas injection into the reactor inlet. Injection of inert gas results in a higher yield of diesel oil (from 78% vol. to 82% vol. of the total liquid product) and lower yield of naphtha (from 10% vol. to 6% vol. of the total liquid product).

Depending on the sulphur content in the feed oil, the sulphur in the diesel produced could be below the 0.1% wt., now specified in Europe for home heating oil.

The heavy oil is a low sulphur fuel. It can be sold as bunker fuel, or as a specialty oil. It is also used as backwash oil in the process plant. Plants that process waste oils face constant fouling of their equipment. Used lubricating oil re-refining facilities usually pre-treat their feedstock with chemicals to remove as much of the metals and solids from their feedstock as possible. They have to test each truck load entering the plant and must add the purchase of chemicals and the disposal of spent chemicals to their operating costs. Thermal cracking units that treat used lube oils, are usually much smaller than re-refiners. They have frequent shut-downs to remove coke deposits and clean heat exchangers. In this process, heat exchangers can be cleaned while the plant is on stream using the backwash oil on site. The solids exit the plant with the coke.

The sulphur and metals, released in the cracking reactions, are mostly attached to the coke when exiting the reactor. The coke is removed from the vapour oil stream as it leaves the reactor. Therefore the sulphur and metals are not present when the oil is condensed into liquid fuels. The oil products leaving the plant are low in sulphur and metals, when compared to products from other used oil thermal cracking facilities. The metals in the coke are thought to act as catalysts in the deterioration of the oil products. The diesel oil produced with this process are more stables than oils produced in other thermal cracking units. The coke is non-leachable and can be disposed of in landfills. It can also be blended in asphalts or cements as a water-repelling additive.

This is a dry process: there is no liquid level in the reactor. The reactor temperature is not limited to the boiling point of the oil feed. This process can treat a much wider variety of waste oils than the conventional thermal cracking units. As an example: synthetic oils are increasingly used as base oils. They are more stable than conventional base oils and do not need to be changed as often to keep engines in good running order. Less oil changes mean less feedstock to used lube oil plants and the feedstock they get contains more contaminants. In a conventional thermal cracking plant, since the reactor temperature is limited to the boiling point of the oil, the more stable oil will require a longer residence time to crack, which limits the plant throughput and profitability.

The process is very flexible. Since the reactor temperature can be changed to suit, this process can be used to treat waste oils that are not necessarily used lubricating oils such as refinery tank bottoms. It can also treat oils that have a high propensity to form coke such as bitumen or marpol.

The reactor in the process is under pressure which results in a more stable operation, and consistent product quality and quantity. A rotating kiln under positive pressure is safer because there will be no oxygen ingress into the reactor, which, if left undetected, could result in an explosion. In the event of a leak, oily vapours would exit into the firebox and would burn in an environment designed to contain flames.

One of the safety features of this process is that there is no vessel containing large amounts of oil in this process. Residence times are low. The only vessel that might contain large amounts of oil is the dewatering flash drum. It is under a steam atmosphere. In an emergency the equipment can be drained within minutes, and steam or another inert gas, is already present in the reaction and product separation units.

In summary some of the advantages of the new thermal processing apparatus include:
  a steady and controllable reaction temperature;
  a specified product slate of consistent quality;
  a protection of the reactor wall from stress and failure due to thermal shock or hot spots;
  preventing coke from depositing and sticking on the reactor walls and internals;
  longer run times, shorter shut-downs, less maintenance cost;
  safer operation;
  no by-products to dispose of in industrial landfills;
  less need for the purchase of chemicals and disposal of spent chemicals;
  a steady and controllable reaction pressure, and
  minimizing of the thermal stress on the reactor walls and/or on the internals.

Advantages of the reactor operating under positive pressure:
  Better control of pressure in the reactor;
  No air ingress into the reactor, combusting the oil within the reactor;
  Less risk of an explosion;
  Steadier flow of products out the reactor; and
  Better control of cyclone operation.

Advantages of the use of a sweep gas, over the use of the new thermal apparatus alone:
  Sweep gas injection stabilizes reactor operations. Both pressure and temperature are selected and kept in the range appropriate to a particular feedstock and desired product slate.
  The presence of sweep gas inside the reactor reduces the partial pressure of the oil, helping the vaporization of the lighter oils. This reduces the incidence of over-cracking, resulting in a more stable oily product slate.
  Sweep gas helps in keeping the velocity of the vapours exiting the reactor, improving the separation of the solids from the reactor products.
  Sweep gas injection effectively reduces oil residence time, thereby reducing the incidence of secondary reactions, and destabilization of the product gasoil.
  Sweep gas injection rates can compensate for variations in feedstock quantities.
  Similarly, sweep gas injection allows the use of the same reactor to treat two very different feedstocks from used lubricating oils to bunker. This, in turn, permits the treating of a wide range of used oils, not just service station oil and the like.
  The injection of the sweep gas makes for safer reactor operations. In the event of a leak in the reactor or downstream equipment, the steam present acts as snuffing steam, reducing the risk of a fire from oil above its auto-ignition temperature coming in contact with air. Nitrogen can also reduce the risk of a fire.
  Sweep gas injection reduces the sulphur in the product oils. For some feedstocks, even the 0.1% wt. sulphur specification for some gasoil applications may be met without further treatment.
  In the event of steam as sweep gas, injection of steam into the reactor can reduce or replace stripping steam injection in the product separation stage.
  Sweep gas injected into the reactor feed line can change the flow patterns and prevent coking in the piping and plugging of either the feed line or feed nozzle. It reduces the viscosity of the oil reactor feed, and contributes to the atomization of the oil droplets through the spray nozzles.

If introduced into the feed line at temperatures above that of the hydrocarbon feed, it reduces the amount of heat that must be generated by the kiln.

Advantages of the Process:

This waste oil thermal cracking process has many advantages over other waste oil cracking or reuse processes:

it is simple and easy to operate;

it is flexible and can treat a wide variety of waste oils, not just used lubricating oils from service stations and the like;

about 95%, preferably about 99%, of the metals and 75% of the sulphur, present in waste oil, exit the process with the non-leachable coke before the vapours exiting the reactor are condensed, the sulphur and metals do not enter into the finished oil products;

all the products from this process are safe and can be sold in current markets. There is no product or by-product to dispose of in incinerators or industrial waste dumps;

the heavy oil produced can be used to back-flush and clean heat exchangers and other equipment on site. There is no need to pre-treat the waste oil feedstock to prevent equipment fouling. Therefore, the laboratory analyses and chemicals required by the waste oil feed pre-treating unit are not needed, neither is their spent chemicals disposal;

the products do not need to meet the stringent specifications of lubricating oil base stocks. This eliminates the need for careful selection of feedstocks, leaving most waste oils to be disposed of into the environment;

the additives in the waste oil feedstocks are destroyed and about 95%, preferably about 99%, of the metals and 75% of the sulphur, present in waste oil, exit the process with the non-leachable coke before the vapours exiting the reactor are condensed. There is no need to dispose of the heavy oil fraction, containing most of the metals and sulphur; and it is viable in smaller plants, with a smaller collection radius and does not need to be subsidized by governments.

Some embodiments of the invention may have only one of these advantages; some embodiments may several advantages and may have all of simultaneously.

Although the present invention has been described with the aid of specific embodiments, it should be understood that several variations and modifications may be grafted onto the embodiments and that the present invention encompasses such modifications, usages or adaptations of the present invention that will become known or conventional within the field of activity to which the present invention pertains, and which may be applied to the essential elements mentioned above.

The invention claimed is:

1. A process for thermally treating a liquid oily feed material, comprising:
   a) passing a stream of the liquid oily feed material into a rotating kiln operating under positive pressure and subjecting the liquid oily feed material to at least one step of thermal treatment performed in the rotating kiln, wherein, in the process, a sweep gas, that is an inert gas or a substantially non-reactive gas, is injected into the rotating kiln or into the liquid oily feed material entering the rotating kiln;
   b) managing the conditions of the thermal treatment to obtain a stream comprising vapours and solids exiting the rotating kiln, which, after cooling, results in at least one liquid phase that is essentially an oily liquid phase; and
   c) routing the vapours and the solids of the stream exiting the rotating kiln to a vapour solid separation equipment that is heated at a temperature that is above the temperature of the vapour exiting the kiln and at least 10 degrees Celsius below the cracking temperature of the vapour;
   wherein the sweep gas represents in weight from 0.5% up to 30% of the weight of the liquid oily feed material, and wherein the temperature in the rotating kiln ranges from 250 to 750 degrees Celsius,
   wherein the thermal treatment is performed at a pressure ranging from 1 to 4 atmospheres;
   wherein the average residence time of the liquid oily feed material in the rotating kiln ranges from 5 seconds to 10 hours;
   and wherein the process is for producing components chosen from coke and non-condensable gas, heavy oils, wide range diesel oils and naphtha, the components being recovered separately or in the form of mixtures of at least two of the components.

2. The process according to claim 1, wherein the positive pressure is at least 1 psig.

3. The process according to claim 1, wherein the liquid oily feed material is selected among: contaminated or uncontaminated oils, waste oils, used lubricating oils, oily tank bottoms, heavy oils, bitumen and other heavy oils, animal fats, vegetable oils, chemically pre-treated oils and combinations thereof.

4. The process according to claim 3, wherein the solids present in the vapours exiting the rotating kiln are selected among: coke, metals, sand, dirt, asphaltenes, preasphaltenes, sulphurous compounds, heavy polymers, salts, cokes containing various compounds chosen from sulphur, halogens and metals, and mixtures thereof.

5. The process according to claim 1, wherein the vapour-solid separation equipment is at least one of a separation box and cyclones, which is heated, at a temperature that is up to 300 degrees Celsius over the temperature of the vapours exiting the kiln.

6. The process according to claim 5, wherein more than 50% of the coke is removed from the vapours exiting the rotating kiln, and, in the case wherein the liquid oily feed material is a used oil, up to 99.5% of the coke is removed from the vapours exiting the rotating kiln.

7. The process according to claim 1, wherein the liquid oily feed material before entering the rotating kiln, is heated at a temperature that is at least 20 degrees Celsius under the cracking temperature of the feed oil.

8. The process according to claim 1, wherein the liquid oily feed material is an oil, and according to the history and/or origin of the oil, was, before entering the rotating kiln, chemically treated, to reduce its metal content.

9. The process according to claim 1, wherein the liquid oily feed material is physically and chemically pre-treated before entering the process.

10. The process according to claim 9, wherein the physical and chemical pre-treatment of the liquid oily feed material comprises heating step(s) that is (are) accomplished in a heater and/or by heat exchange with a hot oil stream, a hot thermal fluid, by the injection of a hot gas, by direct contact with a hotter oil stream, or by a combination of at least two of these methods.

11. The process according to claim 10, wherein the rotating kiln contains metal plates and the heated liquid oily feed material resulting from the heating of the liquid oily feed material, is sprayed onto the metal plates in the rotating kiln that contains metal plates, wherein the liquid oily feed material is thermally cracked and/or vaporized.

12. The process according to claim 1, wherein the vapours and the solids exiting the rotating kiln are swept out of the rotating kiln in 5 seconds to 60 minutes; and the residence time of the liquid oily feed material is a function of at least one of the following parameters: the composition of the liquid oily feed material, the pressure of the rotating kiln, the sweep gas composition and amount, the temperature of the rotating kiln and desired product slates.

13. The process according to claim 4, wherein the vapour exiting the rotating kiln comprises coke and wherein most of the coke, present in the vapour exiting the rotating kiln, is removed from the stream exiting the rotating kiln, before the oil is condensed in the vapour solid separation equipment.

14. The process according to claim 1, wherein the sweep gas is superheated steam and/or nitrogen and/or carbon dioxide and/or recycled non-condensable gas produced in the kiln.

15. The process according to claim 1, wherein demetalisation rate of the total liquid oil products in the oily liquid phase (heavy oil, wide range diesel and naphtha) recovered during the process is at least 60%.

16. The process according to claim 13, wherein the oil recovered from the stream exiting the rotating kiln contains less than 60 PPM of metal.

17. The process according to claim 1, wherein the rotating kiln in operation is substantially free of an organic liquid and/or a slurry phase.

18. The process according to claim 8, wherein the oil was treated by at least one acid, at least one base or mixtures thereof before entering the rotating kiln.

19. The process according to claim 18, wherein the acid is a sulphur acid, a phosphoric acid or mixtures thereof.

20. The process according to claim 13, wherein after coke is removed from the stream exiting the rotating kiln via the vapour solid separation equipment, the coke is further removed from the stream exiting the rotating kiln before the oil is condensated in another cyclone and/or in a self-refluxing condenser.

21. The process according to claim 1, wherein the process is carried out in a reactor comprising:
 a. the rotating kiln;
 b. a heating system;
 c. at least one shelf or row of pegs on the reactor wall;
 d. a charge of plates;
 e. means for bringing the liquid oily feed material to be thermally treated on the surface of at least a part of the plates;
 f. means for removing the fine solids from the reactor;
 g. means for recovering reaction and straight run products; and
 h. means for venting the gas obtained by the thermal processing outside the reactor zone.

22. The process according to claim 21, wherein the wherein the volume of the plates of the charge represents about 4% of the internal volume of the reactor.

23. The process according to claim 21, wherein the weight of the plates allows to scrape coke and/or other solids off the reactor wall and/or off other plates.

24. The process according to claim 1, wherein the thermal treatment is performed at a pressure ranging from 1.2 to 1.5 atmospheres.

25. The process according to claim 1, wherein the average residence time of the liquid oily feed material and the sweep gas in the rotating kiln ranges from 30 seconds to 2 hours.

26. The process according to claim 1, wherein the average residence time of the liquid oily feed material and the sweep gas in the rotating kiln ranges from 90 seconds to 10 minutes.

* * * * *